(12) United States Patent
Yi et al.

(10) Patent No.: US 12,498,913 B1
(45) Date of Patent: Dec. 16, 2025

(54) SYSTEMS AND METHODS FOR TWO-WAY COMMUNICATIONS IN AN OILFIELD SETTING

(71) Applicant: Intellicess Inc., Austin, TX (US)

(72) Inventors: Michael Yi, Austin, TX (US); Pradeepkumar Ashok, Austin, TX (US)

(73) Assignee: Intellicess Inc., Austin, TX (US)

( * ) Notice: Subject to any disclaimer, the term of this patent is extended or adjusted under 35 U.S.C. 154(b) by 263 days.

(21) Appl. No.: 17/931,871

(22) Filed: Sep. 13, 2022

Related U.S. Application Data

(60) Provisional application No. 63/261,176, filed on Sep. 14, 2021.

(51) Int. Cl.
*G06F 8/65* (2018.01)
*G06F 16/28* (2019.01)
*G08B 21/18* (2006.01)

(52) U.S. Cl.
CPC .............. *G06F 8/65* (2013.01); *G06F 16/285* (2019.01); *G08B 21/18* (2013.01)

(58) Field of Classification Search
CPC .......... G06F 8/65; G06F 16/285; G08B 21/18
See application file for complete search history.

(56) References Cited

U.S. PATENT DOCUMENTS

| 8,224,783 | B1* | 7/2012 | Burleigh | G06Q 10/06311 |
| | | | | 707/804 |
| 10,741,185 | B2* | 8/2020 | Gruber | G06F 16/2457 |
| 2005/0060096 | A1* | 3/2005 | Hutchinson | E21B 44/00 |
| | | | | 702/6 |
| 2015/0134620 | A1* | 5/2015 | Crafton | G06F 16/285 |
| | | | | 707/687 |
| 2017/0235007 | A1* | 8/2017 | Holtz | G01V 1/46 |
| | | | | 175/24 |
| 2019/0345809 | A1* | 11/2019 | Jain | E21B 44/005 |
| 2020/0059474 | A1* | 2/2020 | Rojas | H04L 63/0209 |
| 2020/0248545 | A1* | 8/2020 | Maus | E21B 44/00 |
| 2021/0317722 | A1* | 10/2021 | Affleck | E21B 21/08 |
| 2021/0372262 | A1* | 12/2021 | Machocki | E21B 43/30 |
| 2022/0065093 | A1* | 3/2022 | Mittal | G06Q 10/06393 |
| 2022/0205351 | A1* | 6/2022 | Srivastav | E21B 44/00 |
| 2022/0316310 | A1* | 10/2022 | Mohsenian | E21B 43/25 |

* cited by examiner

*Primary Examiner* — Wei Y Zhen
*Assistant Examiner* — Amir Soltanzadeh
(74) *Attorney, Agent, or Firm* — AVEK IP, LLC

(57) ABSTRACT

A method for providing two-way communications between a drilling advisory software and a user of the drilling advisory software includes receiving a drilling data memo, the drilling data memo comprising drilling data; classifying the drilling data memo into a memo type; extracting at least one drilling memo feature from the drilling data; utilizing the drilling memo feature to update the drilling advisory software; and providing a user memo to the user, wherein the user memo comprises information regarding how the drilling advisory software was updated.

9 Claims, 19 Drawing Sheets

| Formation | • 100_DOLOMITE_6380_<br>• 80_DOLOMITE 10_SANDSTONE 10_ANHYDRITE_5080FT |
| Survey | • DS WITS: SURVEY _ 7670.00 INC 91.68 AZM 270.12<br>• DS WITS: SURVEY _ 3654.00 INC 0.69 AZM 277.49 SURVEY 1 |
| Connection | • Connection at 5143.1<br>• Connection @ 7920.8 FT |
| Transfer | • Trans Complete<br>• Moving Fluid F-Pre Mix T_Active |
| Parameter Change | • IN TALLY: HOLE DEPTH SET TO 7826.1<br>• BIT DEPTH CHANGED TO 4575.7 FEET |

FIG. 7

```
"matchID" : "Af10f7ff8-bc82-48d7-8871-45c0e7538925",
"matchName" : "DRILLING_MEMO",
"startTime" : "2018-06-05T19:27:19-05:00",
"drillingMemo" : "TRANS FRACK TO ACTIVE",
"classifiedMemo" : "TRANSFER",
"classifiedProbability" : 0.95,
"message" : "Decreasing transfer event has been detected from drilling
              memos. The belief is 0.176."
```

SYSTEMS AND METHODS FOR TWO-WAY COMMUNICATIONS IN AN OILFIELD SETTING

CROSS REFERENCE TO RELATED APPLICATIONS

This application claims the benefit of priority of U.S. Provisional Patent Application No. 63/261,176, filed Sep. 14, 2021, and titled "Systems and Methods for Two-Way Communications in an Oilfield Setting," the entire disclosure of which is incorporated herein by reference.

FIELD OF THE INVENTION

The invention is directed to systems and methods for improving communications. More specifically, the invention is directed to systems and methods for two-way communications in an oilfield setting for improving oilfield operations.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere According to one embodiment, a method for providing two-way communications between a drilling advisory software and a user of the drilling advisory software includes receiving a drilling data memo, the drilling data memo comprising drilling data; classifying the drilling data memo into a memo type; extracting at least one drilling memo feature from the drilling data; utilizing the drilling memo feature to update the drilling advisory software; and providing a user memo to the user, wherein the user memo comprises information regarding how the drilling advisory software was updated.

In another embodiment, a system for providing two-way communications between a drilling advisory software for a well and a user of the drilling advisory software includes a computing device having a processor in data communication with computer memory. The computer memory has instructions that, when effected by the processor, perform the following steps: receive a drilling data memo, the drilling data memo comprising drilling data; classify the drilling data memo into a memo type; if the drilling data memo is not able to be classified, communicate with the user at least one query related to the drilling data such that the drilling data memo can be classified into a memo type; after the drilling data memo is classified, extract at least one drilling memo feature from the drilling data; update the drilling advisory software using the drilling memo feature; and provide a user memo to the user, wherein the user memo comprises information regarding how the drilling advisory software was updated.

According to a further embodiment, a method for providing two-way communications between a drilling advisory software for a well and a user of the drilling advisory software includes receiving a drilling data memo into the drilling advisory software, the drilling data memo comprising drilling data; classifying the drilling data memo into a memo type; if the drilling data memo is not able to be classified, communicating with the user at least one query related to the drilling data such that the drilling data memo can be classified into a memo type; and after classifying the drilling data memo into a memo type, extracting at least one drilling memo feature from the drilling data.

BRIEF DESCRIPTION OF THE DRAWINGS

FIG. 7 shows some examples of outputs from the classifier on some drilling memos.

WRITTEN DESCRIPTION

Figure 1:
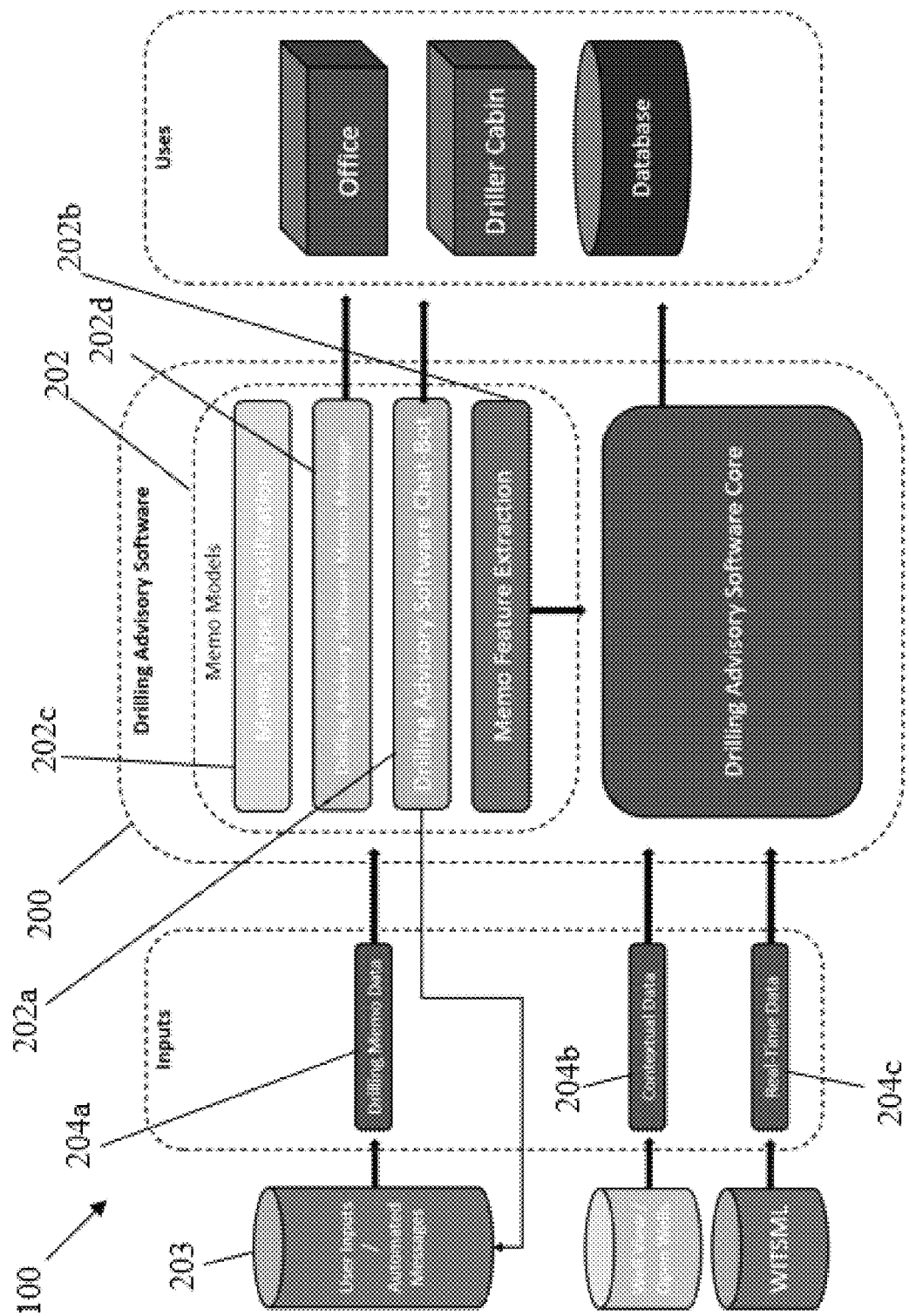
FIG. 1 is a block diagram illustrating a two-way communications system according to embodiments of the invention.

Lost circulation is an uncontrolled flow of wellbore fluids into a well formation and can result in well control problems. Not only can this lead to hole stability issues, but also differential sticking. Kick, which is the opposite of lost circulation, is a fluid influx from the formation. Kick and lost circulation events are large contributors to non-productive time in oilwell drilling. Early detection of kicks is essential in preventing possible blowouts and to improve the safety of crew at the drilling rig. Detecting and capturing both these events quickly helps to reducing non-productive time.

Detecting lost circulation and kick events is often difficult using just surface signals. Traditionally, alarm systems have been used to identify abnormal mud volume changes and flow rates. However, these signals often vary significantly due to surface activities, which can lead to many false alarms. Downhole monitoring can provide a more representative and real-time look at what is occurring downhole, such as the pressure comparisons between the bore pressure and the downhole pressure. Unfortunately, however, tools like these are often expensive and are not present in all well construction operations, and have their own issues with false alarms. Models have also been created to provide an accurate estimate of expected mud volumes and flow rates to provide tight alarm bounds for early detection of well control events. However, these models still generally have trouble accounting for the many surface activities that affect total pit volume measurements. Therefore, a systems and methods that use surface data to identify lost circulation and kick events accurately while accounting for surface activities would be helpful for reducing false and missed alarms.

Embodiments of systems and methods that utilize a Bayesian network to aggregate trends detected in time-series data with events identified by natural language processing (NLP) of driller memos critical to greatly improve the accuracy and robustness of kick and lost circulation detection are described herein. More specifically, the systems and methods described herein are directed to the use of drilling memos, Bayesian networks, and surface activity monitoring to monitor losses and gains using a filtered pit volume. As is detailed below, real-time drilling memos are classified and consumed by drilling advisory software within a two-way communications system to improve pit activity, lost circulation, and kick detection. These drilling memos may also provide drillers direct communication with the system to tweak beliefs and provide additional information. Surface activities such as mud transfers, pit changes, and pump changes are identified using surface data and drilling memos and are used to filter out the noise from the total mud volume signals. Using a filtered loss gain rate and other surface parameters such as flow rate out trends and pressure trends, abnormal loss and abnormal gain beliefs are generated and used to identify possible lost circulation and kick events. The performance of the system may be validated using drilling daily reports that provide information on lost circulation and kick events in the well.

The systems and methods described herein may be implemented in software that is currently running on drilling rigs, the software of course being modified in accordance with the teachings disclosed herein. The artisan will understand that the embodiments disclosed herein may include or have associated therewith electronics (e.g., a computing system, data servers, one or more processors, etc., executing one or more lines of code). The electronics may be used to control and modify the operation of the software (e.g., directing a motor and/or actuator function). In some example embodiments, processor or processors may be configured through particularly configured hardware, such as an application specific integrated circuit (ASIC), field-programmable gate array (FPGA), etc., and/or through execution of software to allow the systems and methods to function in accordance with the disclosure herein. Likewise, the system may make use of a graphical user interface, or other kind of machine-to-human interface, to carry out embodiments of the functions and features described herein. The processor may include any processor used in smartphones and/or other computing devices, including an analog processor (e.g., a Nano carbon-based processor). In certain embodiments, the processor may include one or more other processors, such as one or more microprocessors, and/or one or more supplementary co-processors, such as math co-processors.

In testing, it was surprisingly found that it was possible to identify and quantify losses even during connections and mud additions, where usually pit volume was increasing despite continual losses. The real-time, simultaneous analysis of driller memos provides context to pit volume trends and further reduces the false alarms. The modified software is also able to take account of pit volume that is reduced due to drilling. Quantification of the losses offers more insight into what lost circulation material to use and the changes in the rate of loss while drilling. The approach was found to be very robust in discovering kicks as well and differentiating it from mud removal and wellbore breathing events.

This is the first time that patterns in mud volume addition and removal detected from time-series data have been used along with driller memos using natural language processing (NLP) to reduce false alerts in kick and lost circulation detection. The systems and methods described herein may be particularly useful in identifying kick and lost circulation events from pit volume data, especially when good flow-in and flow-out sensors are not available. Accordingly, one objective is to provide systems and methods for detecting and quantifying lost circulation and kick events using readily available, real-time surface signals.

Definitions

Listed below are definitions of various terms used to describe the invention. The definitions apply to the terms as they are used throughout this specification and claims, unless other limited in specific instances, either individually or as part of a larger group.

Unless defined otherwise, all technical and scientific terms used herein generally have the same meaning as commonly understood by one of ordinary skill in the art to which this invention belongs. Generally, the nomenclature used herein and the procedures are those well-known and commonly employed in the art.

As used herein, the term "drilling memo" means a string that contains a message generated automatically on the rig or written by rig personnel. A drilling memo may contain most vernacular text as well as standard messages. Drilling memos provide the means for allowing rig personnel to communicate with drilling advisory software. As described in detail below, drilling memos may be spoken and converted into text (according to processes known in the art) and fed to the drilling advisory software for use. Drilling memos may generally fall into one of two categories: memos that provide information, and memos that ask questions to the drilling advisory software.

As used herein, "drilling advisory software" means a real-time drilling analytics backend software package that consumes the drilling memos. The drilling advisory software includes a chat-bot, which is described in greater detail below.

As used herein, the term "pump sweep" means adding a fluid mixture to the wellbore that is pumped downhole. A pump sweep may be used, e.g., to clean the wellbore.

As used herein, the term "raw data" means data coming from other sources, such as a data aggregator at the edge (e.g., drilling rig) or data stored in a private or public cloud.

As used herein, "contextual data" means non time-series data such as a morning report or survey data.

As used herein, the term "memo type" means a grouped category of drilling memos. The term includes types such as SWEEP, TRANSFER, and UNKNOWN. As is detailed below, the memo type is used to organize drilling memos into different groups.

As used herein, "chat-bot" refers to a bot that is housed within the drilling advisory software. The bot interacts with the user as described herein to clarify questions, drilling memos, and to provide information and answers to users.

System Architecture

FIG. 1 is a block diagram illustrating the overall structure of a system for two-way communications in an oilfield setting 100. The system 100 incorporates drilling advisory software 200 that is in operable communication with a user (e.g., via an input/output device) and the well, allowing for improved communication between the user and well in order to more accurately determine and modify well performance. Memo models 202 shown within the drilling advisory software 200 depict features of the drilling advisory software 200, which utilizes drilling memo data 204a to communicate with users. The memo models 202 include the chat-bot 202a, feature extraction 202b, classification 202c, and memo message 202d.

As can be seen in FIG. 1, the drilling advisory software 200 receives inputs 203 via drilling memo data 204a, and the drilling memo data 204a is passed through one or more memo models 202. The software package may intake the drilling memo data 204a in the form of a CSV file, which may be updated whenever a new drilling memo is written. The memo models 202 may classify the drilling memo data 204a (e.g., via classification 202c), extract features from the data 204a (e.g., via feature extraction 202b), provide a message to the user (e.g., via memo message 202d), and communicate with the user (e.g., via chat-bot 202a) if additional information is needed, for example.

The drilling memo data 204a may include a variety of messages ranging from automatic messages about connection depths, for example, to comments that rig personnel put into the system. Whatever the subject of the drilling memo 204a, the drilling memo data 204a includes two key elements: Date Time and Drilling Memo.

The "drilling memo" is a string that the rig or personnel writes. Note that drilling memos can be written by users and/or automatically generated (such as a message indicating that a condition is met, for example, a connection). The messages generated by the rig may be informed by one or more sensors operably configured to provide a drilling memo 204a for use by the drilling advisory software 200. The "date time" is the time when the drilling memo 204a is written, not when the drilling memo 204a is received by the drilling advisory software 200. This is important because the drilling advisory software 200 may be configured to only use drilling memos 204a that are close in time to the current real-time data stream. The exact time threshold may be predetermined and the drilling advisory software 200 may be configured to only utilize those memos 204a which fall within the predetermined threshold. For example, while a drilling memo 204a can be inserted at any time, if the event occurred outside the predetermined threshold (e.g., 10 minutes, 30 minutes, one hour, two hours, etc.), it may be stored but not used by the drilling advisory software 200.

Table 1 illustrates examples of drilling memo data 204a. The examples provided in Table 1 are only a fraction of the many varieties of drilling memo data that may be experienced by the system 100. During testing, over 490,000 memos were generated from over 270 wells. While the memos in this table provide notes of what is occurring during the drilling process, they can also be direct messages to the drilling advisory software 200 with queries or other additional information.

TABLE 1

Sample drilling memo data

| Date Time | Drilling Memo |
| --- | --- |
| Mar. 21, 2019 14:23:03 | Connection @ 7342.3 ft |
| Mar. 21, 2019 14:31:15 | Moving Fluid F-Pre Mix T_Active |
| Mar. 21, 2019 14:33:37 | TRANS COMPLETE |
| Mar. 21, 2019 14:53:03 | SWEEP HOLE W/30 BBL |
| Mar. 21, 2019 14:55:43 | BACK ON ACTIVE |
| Mar. 21, 2019 15:11:23 | Connection @ 7431.1 ft |
| Mar. 21, 2019 15:12:35 | IN 33_8.7 OUT 33_8.7 HVY |

The drilling memos 204a provide an interface to consume textual information that can be both automated messages and vernacular messages. Events like pump sweeps that are not easily detected by real-time surface channels can easily be identified by drilling memos that identify the start and stop of the pump sweep. With this information, the drilling advisory software can monitor the start of the sweep and determine the sweep location in the wellbore.

Drilling memo data 204a may be provided to the drilling advisory software 200 as a real-time input, e.g., in CSV format. The CSV may be updated whenever new drilling memo data 204a is provided. While real-time channels such as total mud volume, flow rate out, and pressure measurements provide insight into potential lost circulation and kick events, drilling memo data 204a provides additional details into events and actions that could affect these real-time channels.

In addition to drilling memo data 204a, the drilling advisory software 200 uses real-time data 204b (e.g., wellsite information transfer standard markup language (WITSML), which allows for the drilling rig to communicate data to the user as is known to those of skill in the art) and contextual data 204c (e.g., from well integrity software, such as WellView® or OpenWells®) to perform calculations. The drilling memo data 204a supplements the real-time data 204c and the contextual data 204c.

The use of drilling memo data 204a allows for two-way real-time communication between the drilling advisory software 200 and the user (e.g., rig/office personnel). By consuming the drilling memos 204a and providing the rig a relationship and direct communication with the lost circulation and kick models, the drilling advisory software 200 can utilize both surface channels and textual information from drilling memos 204a to identify events.

Figure 2:
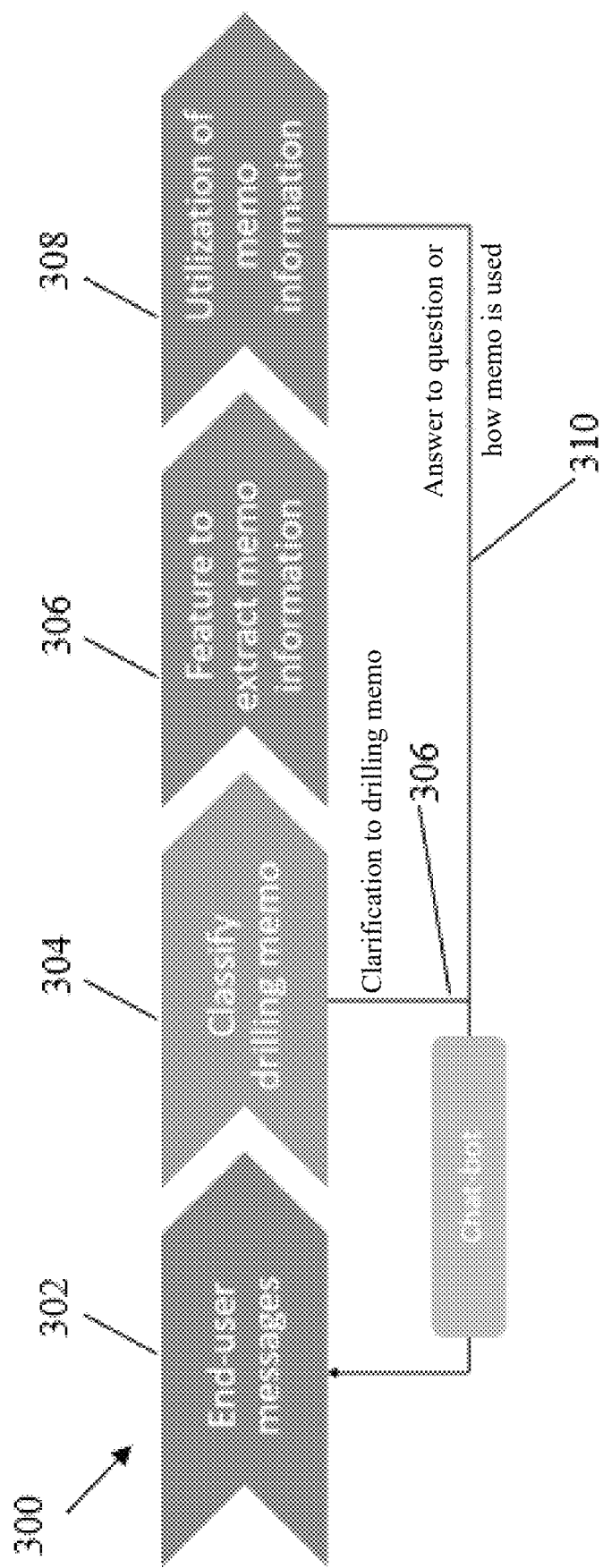
FIG. 2 is a flowchart illustrating the general process a drilling memo goes through withing drilling advisory software of the two-way communications system according to embodiments of the invention.

To use the drilling memo data 204a, the software 200 is configured to classify the drilling memo data 204a into a grouped memo type and then extract information from the drilling memos 204a. FIG. 2 illustrates the general process 300 that drilling memos 204a go through within the drilling advisory software 200. When a new drilling memo 204a is added at step 302, the drilling advisory software 200 attempts to classify the drilling memo 204a into one or more memo types at step 304 (e.g., via classifier 202c). This classification process organizes the drilling memos 204a into one or more groups so information may be more easily extracted. Given the size and many possible varieties of drilling memos 204a, a semi-supervised method was used to develop the classifier 202c to categorize the drilling memos 204a into groups.

The classifier 202c may be a maximum entropy (MaxEnt) model found in the OpenNLP library, for example. The classifier 202c may be trained using a semi-supervised method based on drilling memos 204a from multiple wells. For example, during testing, the classifier 202c was trained using a semi-supervised method on a dataset with nearly 500,000 drilling memos from over 250 wells. The training requires first clustering data to find general groups that can be placed into memo types. Certain clusters may be merged depending on the general contents of the cluster. Manually labeling through a script may be completed to label certain strings in drilling memos that could fit in certain memo types.

Before the data may be clustered, the drilling memo data 204a is preferably cleansed using one or more scripts to remove certain words to clean up the string. Exemplary cleansing which may be made to the drilling memo data 204a to improve the performance of the clustering algorithm used may include, for example, converting similar words to help with clustering (e.g., m/w, m_w, mwi are all converted to mw), removing special character, removing numbers, removing punctuation, stemming (reducing inflected/derived words to the base form, e.g., eating→eats, eats→eat), removing stop words, removing extra white space and tabs, and modifying all text to lowercase lettering.

Figure 3:
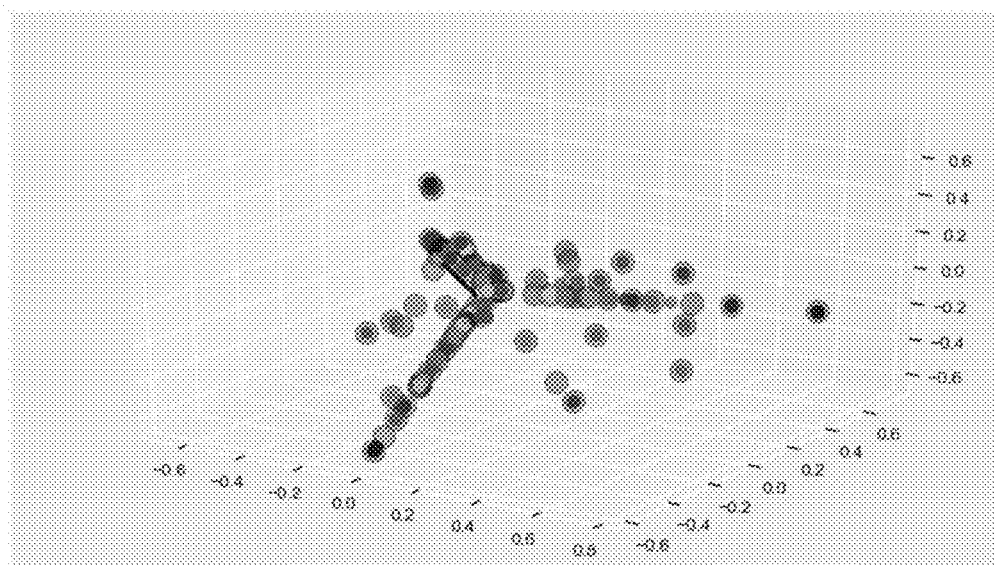
FIG. 3 is a 3D visualization of 100 drilling memo clusters.
Figure 4:
FIG. 4 is a 3D visualization showing the centers of the drilling memo clusters.

After filtering through a script, the data may be clustered using a KMeans clustering algorithm with 100 clusters. FIG. 3 is a 3D visualization of 100 drilling memo clusters and FIG. 4 shows the center of the drilling memo clusters. Here, eight clusters can be seen with some of the most common drilling memos 204a. These include memos related to connections, surveys, and mud weights.

Figure 5:
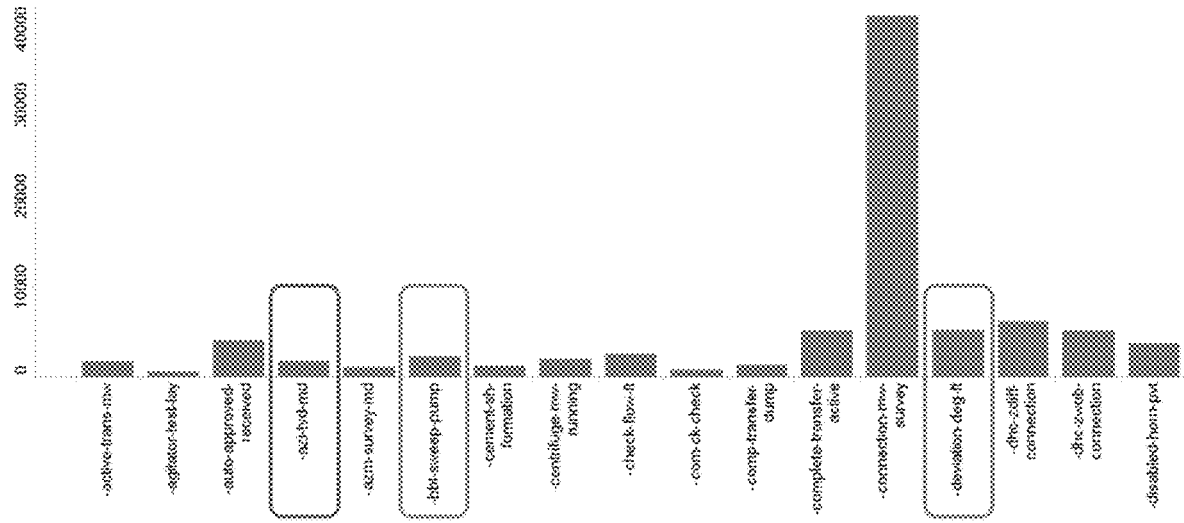
FIG. 5 is a bar chart of the clustered drilling memos showing the three most indicative words used to cluster memos.

FIG. 5 is a bar chart of the clustered drilling memos showing the three most indicative words used to cluster memos. In FIG. 5, the left-most rectangle shows a cluster of drilling memos 204a where the most indicative words are "azi, tvd, md." By looking at these words, it can be determined that the most likely memo type for these clusters would be memos related to surveys, as this is the type of information that surface data would be expected to include. The middle rectangle shows a cluster where the most indicative words are "bbl, sweep, pump." In this case, the cluster likely falls under memos related to sweeps. Finally, the right-most rectangle shows a cluster where the most indicative words are "deviation, deg, ft." These are again memos likely related to surveys.

Figure 6:
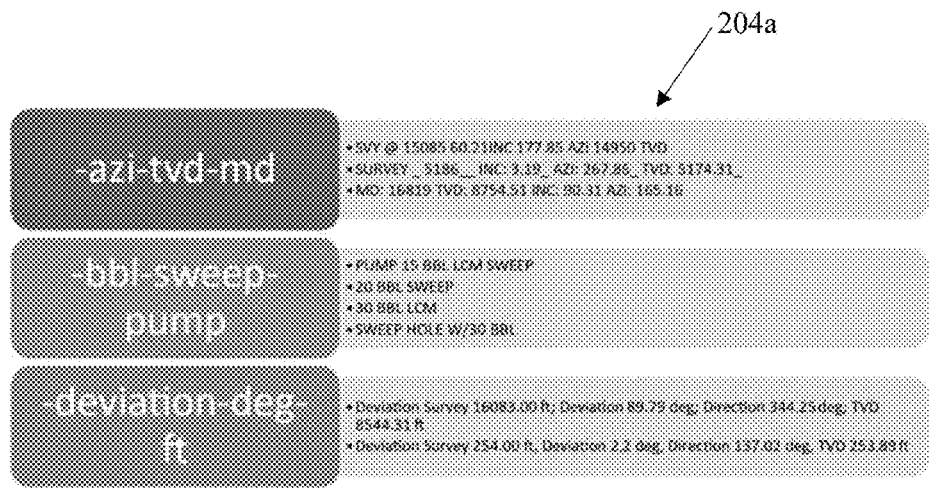
FIG. 6 shows a preview of sample memos that fall under various clusters highlighted in FIG. 5.

FIG. 6 shows a preview of sample memos that fall under various clusters highlighted in FIG. 5. For example, the middle box in FIG. 6 shows the most important words for this cluster are bbl, sweep, and pump. While the clusters group up common memos, certain clusters may be grouped together with others to create a generic memo type. For example, the -azi-tvd-md cluster may be combined with the-deviation-deg-ft cluster since they both provide survey related information.

Each cluster in FIG. 4 was observed and labeled using one of 34 memo types listed below in Table 2. This list may be expanded as other types of memos 204a are consumed and more interaction between the drilling advisory software 200 and the user occurs. Certain drilling memos 204a with strings that identify which memo type they belong to may also be scripted to be labeled as such. Drilling memos 204a that contain text that indicate that it should be categorized into a certain memo type may be processed separately through custom scripts. For example, memos that included "sd inc azm", "survey", "svy", etc. are categorized into the SURVEY memo type because those words are a strong indicator that the drilling memo 204a is a survey type. Manual labeling may help strengthen the drilling memo labels used for the classifier trained on the clustered and grouped data. This allows for quick labeling of a large dataset with many different and varying labels.

TABLE 2

Table of drilling memo types
Drilling Memo Types

| | | | |
|---|---|---|---|
| ALARM | AUTO APPROVE | BACK ACTIVE | CASING TEST |
| CENTRIFUGE | CHECK COM | CHECK SHOT | CONNECTION |
| DOWNLINK | DUMP | FILL PIPE | FLOW CHECK |
| FLUID RATE | FORMATION | MUD WEIGHT | NIPPLE |
| NONE | PARAMETER CHANGE | PUMP DISPLACEMENT | RECYCLE PUMPS |
| RIG SERVICE | ROT HEAD | SLIDING | SLIP AND CUT |
| SLOW PUMP RATE | SOFTWARE COMMAND | STRAP PIPE | SURVEY |
| SWEEP | TEST | TIGHT CONNECTION | TRANSFER |
| UNKNOWN | ZEROING | | |

New data may be used to improve the model. In such a case, the previous process is repeated: the data is labeled and then the classifier is trained. However, this process is only required for the new memo data that is trained. This can then be added to the previous model that was already trained. The final trained classifier 202c can correctly classify drilling memos into memo types with approximately 98% accuracy. FIG. 7 shows some examples of outputs from the MaxEnt classifier on some drilling memos.

With a trained dataset, most memos 204a provide generic information about the well rather than asking specific questions to the drilling advisory software 200. For questions that are directed to the drilling advisory software 200, they would fall in the software memo type. For example, a "Formation" drilling memo may read: "80_DOLOMITE_10 SANDSTONE 10_ANHYDRITE_5080FT." A "Connection" drilling memo may read: "Connection @ 8324.5." And "Software Command" drilling memos may read: "Change the stick slip threshold to 0.7" or "How could I improve ROP?", for example. While the formation memo type provides information to the drilling advisory software 200, the "Software Command" memos are either requests or questions posed directly to the software 200. In other words, the formation memo can be used to provide additional data to formation related models, but the questions and requests to the drilling advisory software 200 require the software 200 to make a change or provide an answer.

Referring again to the process outlined in FIG. 2, importantly, if the drilling advisory software 200 is unable to classify the drilling memo 204a at step 304, the chat-bot 202a may be used at step 306 as an interface between the software 200 and the user to determine how the memo 204a should be utilized. As described further below, the chat-bot 202a may communicate with the user to clarify the message or let the user know that the drilling advisory software 200 is unable to use the message. In the case where the memo 204a is classified, features are used to extract information from the provided drilling memo 204a at step 308. The information extracted from the drilling memo 204a may either be used to add to the models of the drilling advisory software 200 or return an answer to the user. In either case, the chat-bot 202a may let the user know either how the memos are used or provide an answer to the user's question at step 310.

It is necessary to classify drilling memos 204a into memo types to understand what type of features should be used to extract the information. In some instances, drilling memo data 204a may be classified into more than one group memo type and the information extracted for use in multiple ways within the software 200. For example, a SWEEP memo type may identify the start of a memo while a BACK_ACTIVE memo type may identify the end of the SWEEP mud addition.

Once the drilling memo 204a is classified into one or more memo types, the feature extraction memo model 202b extracts relevant information from the drilling memo 204a. By classifying each drilling memo 204a into a memo type, such as those described above, the software 200 can determine what type of method is used to extract information from the drilling memo 204a. In other words, the memo type serves as a method of organizing the drilling memos 204a, and once organized, features are used to utilize the text within the memos 204a.

For each memo type, a method/feature must be created to extract the information from the actual memo string. This can be different for every memo type. For example, for a SURVEY type, the software may be configured to extract total vertical depth, azimuth, and inclination data. For a TRANSFER type, the software is configured to identify if the memo is a start or a stop of a transfer event. For a SENTINEL type, the software determines what property to change within the drilling advisory software.

There may be multiple extraction methods utilized for a single memo type given the variety of drilling memos 204a that can fall under a category. The methods may also change depending on how the extracted information is used in various models. For example, the FORMATION memo type normally includes formation percentages at a given depth. This information can be used in several models, such as the loss gain model as well as the drilling dysfunction model. Therefore, this memo 204a may require several methods to extract information that is pertinent to each of the models the data is supplementing.

Figure 8:
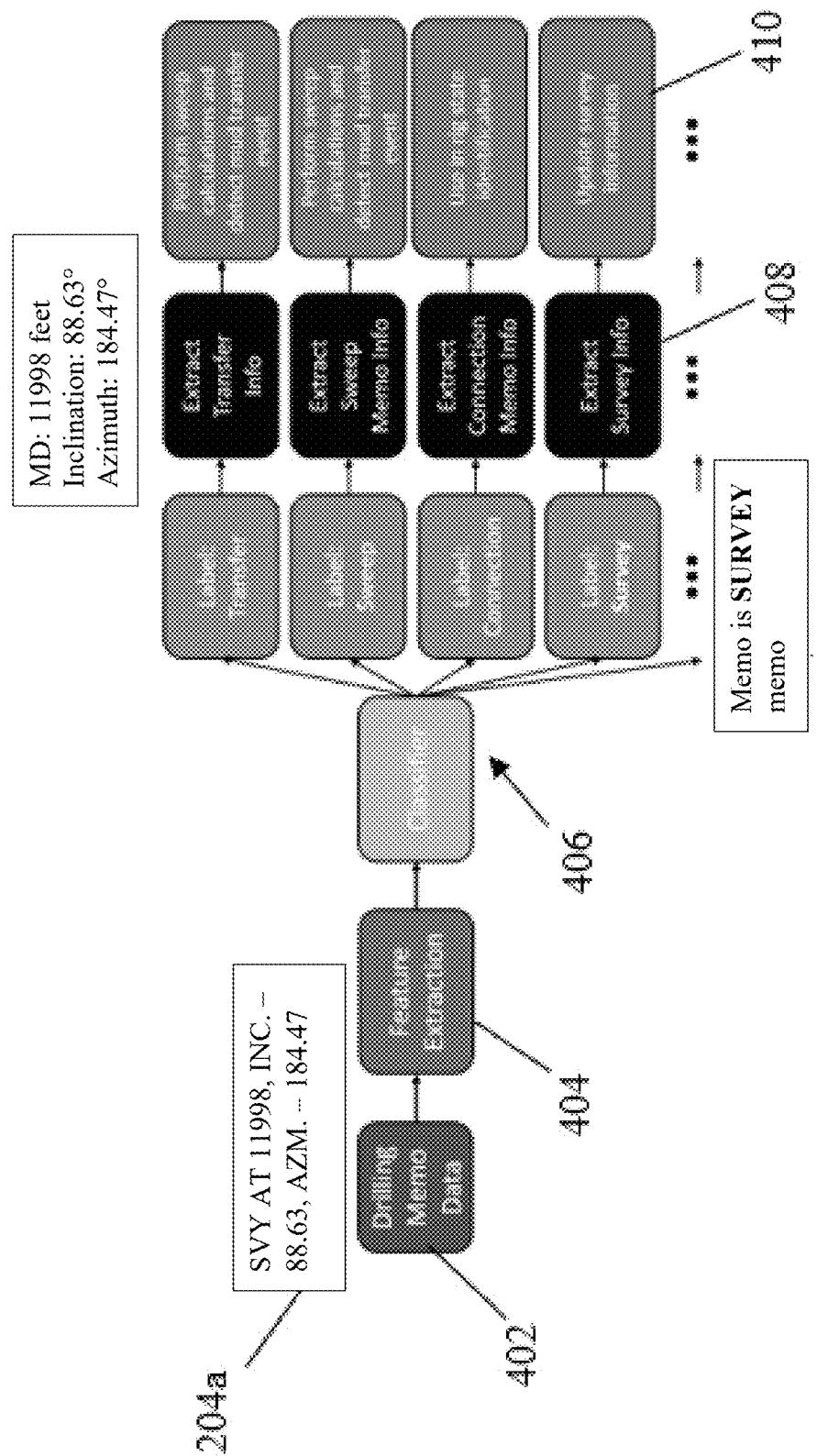
FIG. 8 illustrates the process the feature extraction memo model undertakes within the drilling advisory software.

FIG. 8 illustrates the process 400 the feature extraction memo model 202b undertakes within the drilling advisory software 200. The feature extraction memo model 202b is engaged after a memo 204a is categorized into a memo type via the classification memo model 202c so that the drilling advisory software 200 knows how to utilize the information provided within the memo 204a. The process 400 begins at step 402 by receiving drilling memo data. At step 404, the drilling memo data 204a passes through a feature extraction to determine at a high level the information that is provided within the drilling memo data 204a. In the example shown in FIG. 8, a survey drilling memo 204a is provided to the software package. The process moves to step 406, where the survey information from the drilling memo 204a as identified by the feature extraction at step 404 is classified into one or more memo types (label) using a natural language processing (NLP) model trained on historical data. Here, the drilling memo utilizes "SVY" text in the drilling memo data 204a to determine the label: Survey. Once the memo type is known, the relevant information from the memo 204a can be extracted at step 408. In FIG. 8, the survey drilling memo 204a may be extracted using a feature that pulls out the measured depth, inclination, and azimuth from the text, as this is information that would be expected from survey-type drilling memo. In the example shown in FIG. 8, the survey information includes a measured depth of 11,998 feet, an inclination of 88.63° and an azimuth of −184.47°. This information may be stored and passed on in step 410 for further use in the drilling advisory software 200 for models such as torque and drag and tortuosity.

Once features have been extracted from the drilling memos 204a, they can be utilized in the various models within the drilling advisory software 200. Several drilling memos 204a may be used to supplement the loss gain model, the pump sweep model, and the advisory software configurations for example. However, additional features may be added, and other memos 204a may be used to supplement other models within the advisory software 200 not specifically described herein.

Any relevant information from memos 204a to the drilling advisory software 200 can be utilized so long as a feature is developed to consume the valuable information in the drilling memo 204a. Some examples of memo utilization include pump sweep detection using sweep memos; detecting pit volume transfer events and whether they are adding or removing mud; changing configuration settings in the drilling advisory software, including changing parameters such as belief thresholds or constants; updating survey information using real-time survey points; and receiving mud log formation data for ROP models and improving dysfunction detection.

Figures 9, 10:
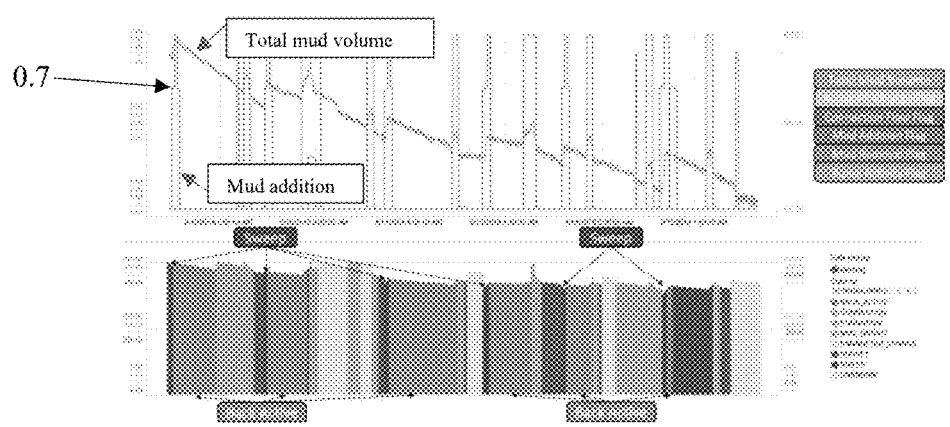
FIG. 9 shows an exemplary event log which may be provided to the driller.
FIG. 10 shows an example of an output from the drilling analysis software that uses memos to provide information for the output.

When a drilling memo 204a is classified and its features extracted and used in a model, it is important that the user is aware of what the memo 204a is used for. FIG. 9 shows an exemplary event log 500 which may be provided to the driller. Here, the event log includes information about how a drilling memo is used to detect the start of a mud transfer event. In this case, the classifier has classified "TRANS FRACK TO ACTIVE" as a TRANSFER event. It also provides a message to the user that a decreasing transfer event has been detected by using a combination of the drilling memo message and real-time data. The message to the user further includes that the total pit volumes are increasing as a result of this transfer activity. It is key to provide the user feedback and information regarding what the model is using the drilling memos for rather than only having the drilling memo 204a communicate with the models. This provides two-way communication so the user is able to understand how the drilling memos 204a are affecting the analysis.

FIG. 10 shows an example of an output from the drilling analysis software that uses memos to provide information for the output. In FIG. 10, the output illustrates the likelihood of a mud addition where 0 is a low likelihood of mud addition and 1.0 is a high likelihood of mud addition. At around 0.7, the system receives a drilling memo, causing the belief (or likelihood) to jump to 1.0. At the same time, the drilling analysis software subtracts real time data (total mud volume) to provide an output that as accurately as possible predicts the presence of an event. Without the feature extraction of the mud addition (in this example), it would not be possible to see the first increase, so the operator would not be able to identify the mud addition condition until much later.

Figure 11:
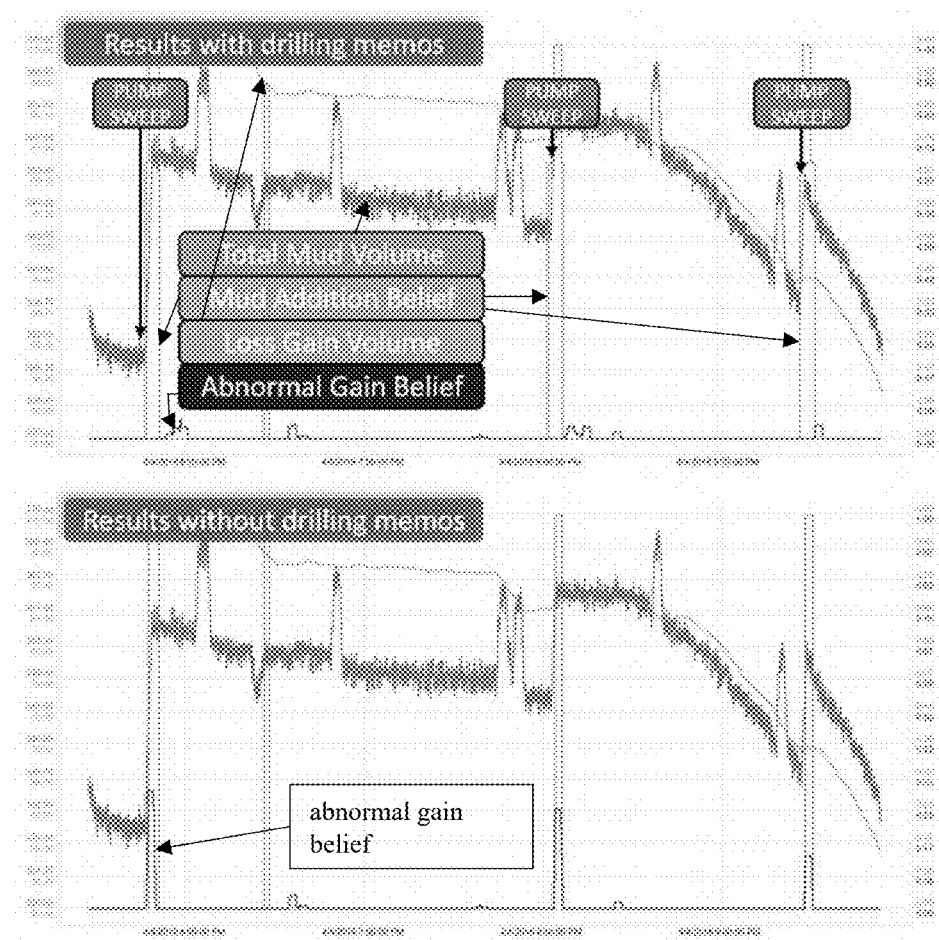
FIG. 11 illustrates the performance of the lost circulation and kick model when drilling memo data is provided (top graph) versus when there is no drilling memo data (bottom graph).

FIG. 11 illustrates the performance of the lost circulation and kick model when drilling memo data is provided (top graph) versus when there is no drilling memo data (bottom graph). The drilling memo data can identify the mud addition event nearly instantly with both real-time channels and drilling memo data. In this case, three "PUMP SWEEP" memos were read when the mud addition event started. However, in the data without the drilling memo data, the mud addition belief is not able to identify mud addition events as quickly. Since the mud addition events are not determined as quickly, the abnormal gain belief reaches higher values compared to the results with drilling memos. This demonstrates how external information, like the drilling memo text, can provide improvements to the kick model.

One key aspect of the invention is the ability for two-way interactions between the user (through drilling memos) and the software 200 (through output strings), and the utilization of user and rig information to supplement models, included within the drilling advisory software 200. To accomplish this, information regarding how the drilling memos are used in the features may also be presented through the chat-bot 202a that lets the user know what the software 200 is doing with the drilling memos 204a. For example, when a transfer event is detected and the transfer feature is used to extract the information, the software package may return the following string as an event: "Decreasing transfer event has been detected from drilling memos. The belief is 17.6%."

As briefly noted above, the chat-bot 202a may also be used for drilling memos 204a that are either questions or not understood by the memo type classifier 202c. Having a chat-bot 202a within the software 200 helps pinpoint the intentions of the user and provides interaction and communication between the software 200 and the user. The chat-bot 202a may help with more vernacular drilling memos 204a where the drilling advisory software 200 is not interpreting a standard text, but rather a question or message from the user, for example. The chat-bot 202a may attempt to categorize the memo type. However, for questions that the user has, this requires the questions to be mapped to a certain response. By using a chat-bot 202a, the user may be guided into an answer that the drilling advisory software 200 will provide.

For drilling memos 204a that are not understood by the drilling advisory software 200, the drilling advisory software 200 may be configured to communicate that the drilling memo 204a is not understood and ask the user for additional information through the chat-bot 202a. The drilling advisory software 200 may also clarify for the user what types of messages it may understand better. This is done through messages from the drilling advisory software 200, posing inquiries via the chat-bot 202a. The chat-bot 202a may also provide suggestions to hone down the question from the user.

The chat-bot 202a may help the software 200 understand what memo type the drilling memo text falls under. If needed, the chat-bot 202a can also help specify what type of feature is used to extract the information. For questions to the drilling advisory software 200, there may be predefined answers. While the answers may be predefined, they are also dynamic in nature. For example, the answers can be calculations using outputs stored in the software. In some embodiments, the answers are textual.

Figure 12:
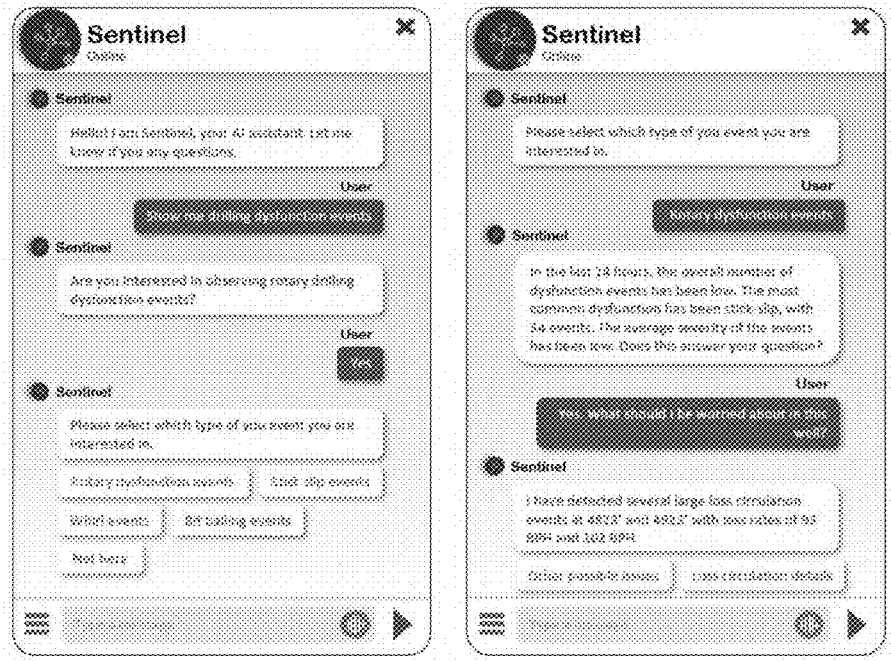
FIG. 12 illustrates an exemplary chat-bot interaction.

An example of a chat-bot interaction is shown in FIG. 12. Here, the user asks the drilling advisory software 200 some general questions about issues while drilling. Note that the user can either select one of the predefined commands or write their own message to the drilling advisory software 200. The chat-bot 202a may help to guide the user to predefined answers that the drilling advisory software 200 provides. As noted above, while these answers are predefined to some degree, they may still output dynamic information that is stored within the advisory software 200. In the example shown in FIG. 12, the chat-bot 202a outputs information about the dysfunction events as well as loss circulation issues. While these answers are "predefined," they include information calculated from the models within the advisory software 200. For user questions that match very closely with a defined answer, the chat-bot 202a may directly output that response. For questions that need additional clarification, the chat-bot 202a may either provide suggestions that most closely match with the user's query, or directly match to the answer.

Figure 13:
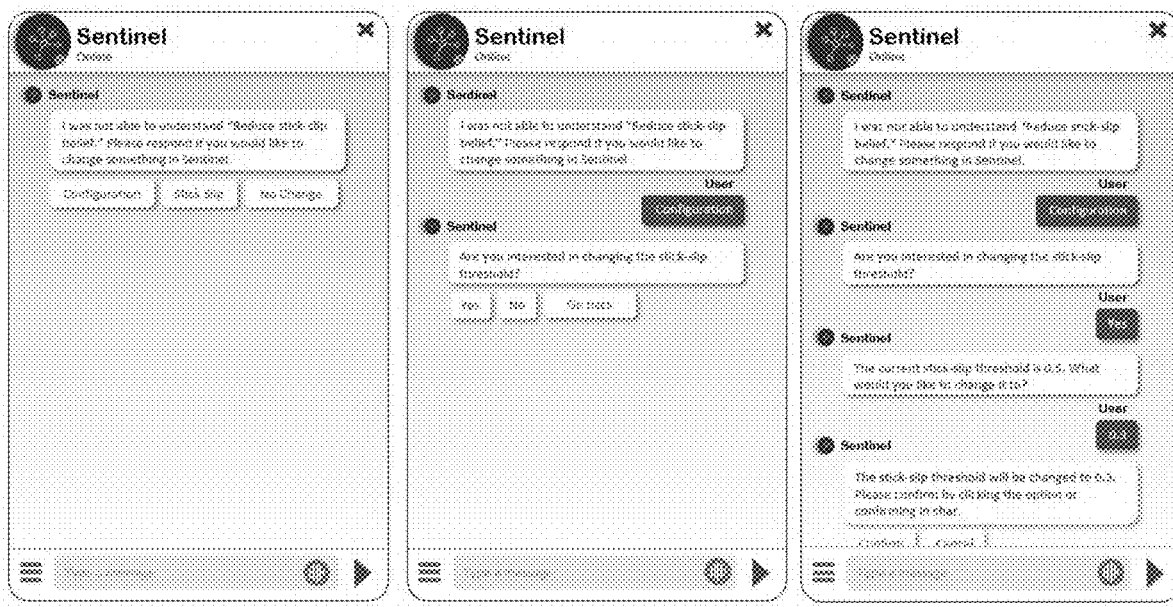
FIG. 13 illustrates an example chat between the software and a user when a drilling memo is not understood by the drilling advisory software.

If no answer is found, the advisory software 200 may answer that it is unable to answer the question and give some suggestions for other answers. FIG. 13 illustrates an example chat between the software 200 and a user when a drilling memo 204a is not understood by the drilling advisory software 200. The chat-bot 202a attempts to clarify the memo 204a so that the textual information, command, or query is correctly used. If no clarification is provided, the drilling advisory software 200 will not be able to use the memo 204a in any models or provide any information.

Any interaction with the chat-bot 202a can also be done through using voice messages which are converted to text according to known techniques.

Figure 14:
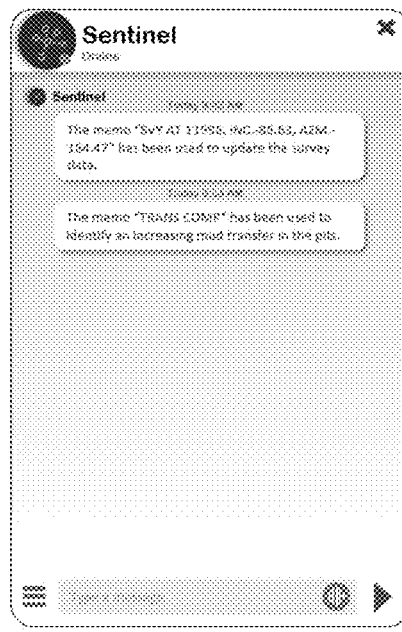
FIG. 14 shows an example of the drilling advisory software chat-bot describing how the memos are being utilized in the models.

As previously described, the chat-bot 202a may also provide users with information on how each drilling memo 204a is utilized. This provides feedback to the user on how memos 204a are being utilized within the drilling advisory software 200 and how the memos 204a are contributing to the models. FIG. 14 shows an example of the drilling advisory software chat-bot 202a describing how the memos 204a are being utilized in the models. By being transparent about the effects of the memo 204a through the chat-bot 202a and how memos 204a are utilized and clarified, users can gain confidence in how the drilling advisory software 200 uses the textual information provided by the user.

Figure 15:
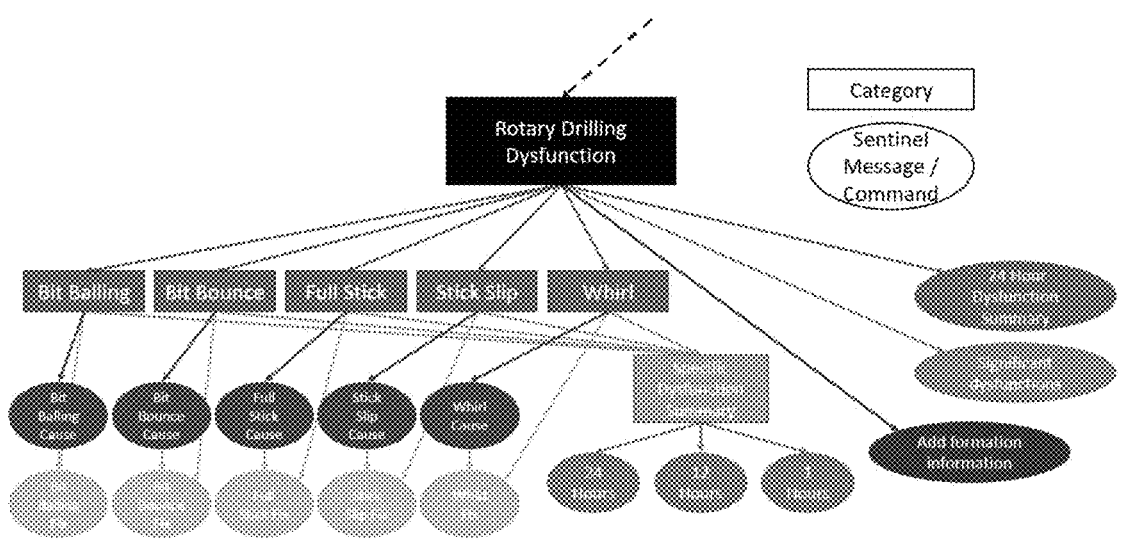
FIG. 15 illustrates an example of the organization of chat-bot responses.

FIG. 15 illustrates an example of the organization of chat-bot responses. The boxes represent categories that the chat-bot 202a will go through to determine its response. The ovals shows where some type of messages or command is performed by the drilling advisory software 200 when the chat-bot 202a reaches that point. Note that the oval also can act as a category.

In the tree structure illustrated in FIG. 15, the user would have navigated to the rotary drilling dysfunction category. If the user is trying to find the cause for stick slip, the user would tell the chat-bot 202a that it is interested in stick slip. The chat-bot 202a would provide the user options for stick slip cause and specific dysfunction summary for stick slip. The user can then choose to select stick slip cause to determine why stick slip is occurring.

This tree structure can be used to easily add responses or commands for different categories within the drilling advisory software 200. It also provides the flow the chat-bot uses when interacting with the user on how to navigate to a specific answer to their question or command. If the user's text is very clear, the command or message can be directly accessed without needing to navigate through all the previous categories. However, this provides a structure to navigate to an answer if the drilling advisory software 200 is unable to directly interpret the message.

If the chat-bot 202a is used, additional messages may be written in the drilling memo data 204a when the user replies and interacts with the chat-bot 202a. As shown in FIGS. 1 and 2, there may be a cycle between the drilling advisory software chat-bot 202a and the user-inputs 203 where the drilling advisory software 200 and the user communicate with each other.

Thus, the chat-bot 202a may act as an interface between the user and the software 200. This is used to communicate all information between the software 200 and the user. This includes messages related to when a drilling memo 204a is read by the software 200, how the drilling memo 204a is utilized within the software 200, asking for clarification about a drilling memo 204a, communication between the software 200 and user to hone down memo type, and answers to user's questions.

Referring again to FIG. 11, as noted, the graph is an output from machine learning models that shows result of lost circulation and kick models with drilling memos and without drilling memos. One exemplary embodiment of a machine learning model is a Bayesian network. The following description illustrates how a Bayesian network may be used as a machine learning model according to embodiments of the invention.

Figure 16:
FIG. 16 is a graph showing the effect of connections, mud additions, and mud removals on total pit volume measurements.

Total pit volume offers some insight into potential lost circulation and kick events. However, the total pit volume is often plagued by noise from miscellaneous surface activities that often appear as possible influxes and losses. FIG. 16 provides several examples of surface activities that affect total mud volume measurements. Item A shows a sudden jump and then decrease in the total mud volume when a drilling connection is made due to wellbore breathing and mud compressibility when pumps are turned off and on. Item B shows a sudden increase in the total mud volume when a mud addition is made to the pits. Item C shows a sudden decrease in the total mud volume when a mud removal event occurs at the pits. While these activities demonstrate a sudden change in the total mud volume, they are not influx nor loss events, but rather surface activities that affect the pit volume measurements.

Figure 17:
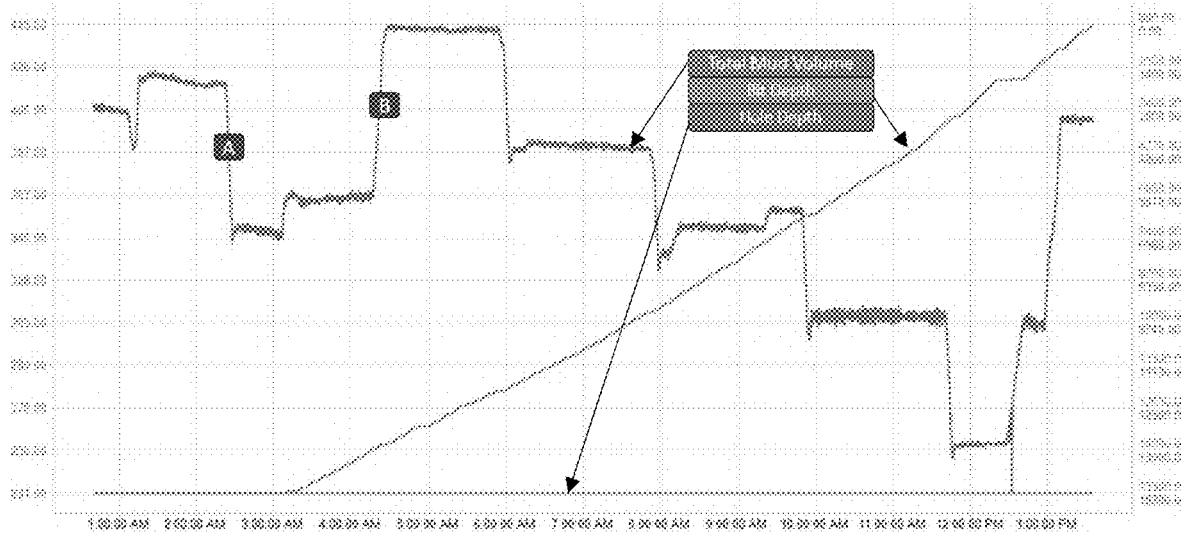
FIG. 17 is a graph showing pit changes that affect total mud volume measurements.
Figure 18:
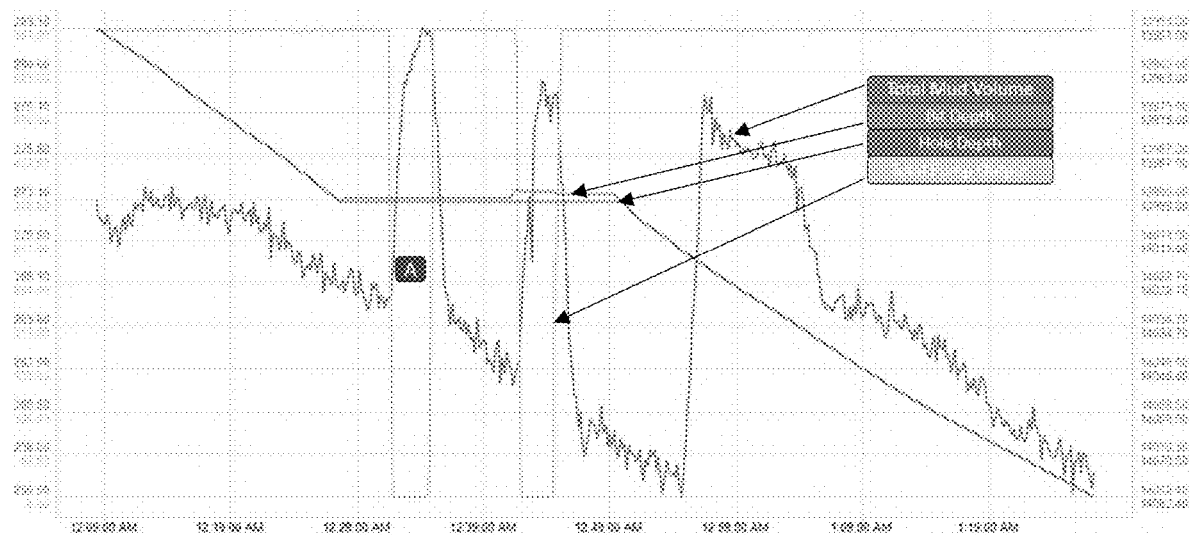
FIG. 18 is a graph showing total pump output changes that affect total mud volume measurements.

FIG. 17 illustrates several additional examples of pit volume changes. Item A illustrates a rapid decrease in total mud volume, which is a mud removal event or more specifically, a pit removal event. Item B shows the opposite, where there is a rapid increase in the total mud volume. This is a pit addition event. Again, while these signals may indicate an increase/decrease in total mud volume, they are symptoms of surface activities and not formation fluid movements. FIG. 18 provides an example of how total pump output changes affect total mud volume sensors. Item A shows an instance where the pumps are turned off and then on, resulting in an influx in the total mud volume. After item A, a similar signal is seen again when the pumps are turned off and on again during a connection flow back event. These are primarily due to wellbore breathing and changes due to the compressibility of the mud when the pumps are turned on and off.

To use total pit volumes as a measure of lost circulation and kick events, mud volume data from the sensors must be adjusted to only represent volume changes due to downhole events rather than surfaces activities. Therefore, a method was developed to filter out, in real-time, connection flow back, pump activity flow back, mud additions, mud removals, and pit changes. By filtering out these mud-volume affecting activities in real-time, an adjusted total mud volume can be created. The adjusted volume is called the loss gain volume (depicted in the example in FIG. 11). The loss gain volume provides an intuitive measure of fluid losses similar to the pit volumes, but accounting for other surface activities. It must be noted however that detecting these activities rapidly in real-time can prove to be challenging. Because these activities begin changing total mud volume the moment they start, the activity must be flagged nearly instantaneously to prevent the loss gain model from flagging the initial portion of the activities as influxes or losses. By using real-time channels and drilling memos, several models were created to detect the mud volume affecting activities rapidly.

Figure 19:
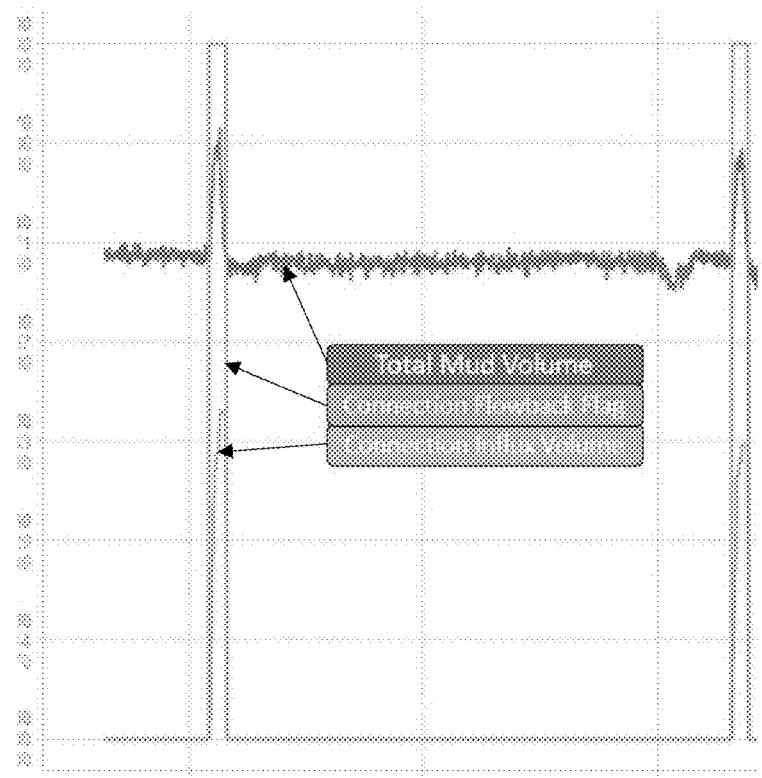
FIG. 19 is a graph illustrating examples of connection flowbacks identified by a model.

To identify connection flow back events, block height, total pump output, total mud volume, bit depth, and hole depth may be used to determine the start and end of a connection flow back event. Block height and total pump output may be used to identify the start of the connection when pumps are shut off and block height is lowered all the way to the bottom. The connection flow back flag is flagged as true until the total mud volume has reached its original starting value (accounting for losses/gains during the event), or a time threshold is passed. FIG. 19 is an example graph showing two connection flow backs flagged by the model. In this example, the connection flow back event is flagged until the pit volume reaches its previous value before the flow back, which is seen by the line labeled "Connection Flowback Flag". By identifying the connection flow backs, the influx volumes can also be measured during these events, seen by the line labeled "Connection Influx Volume."

Figure 20:
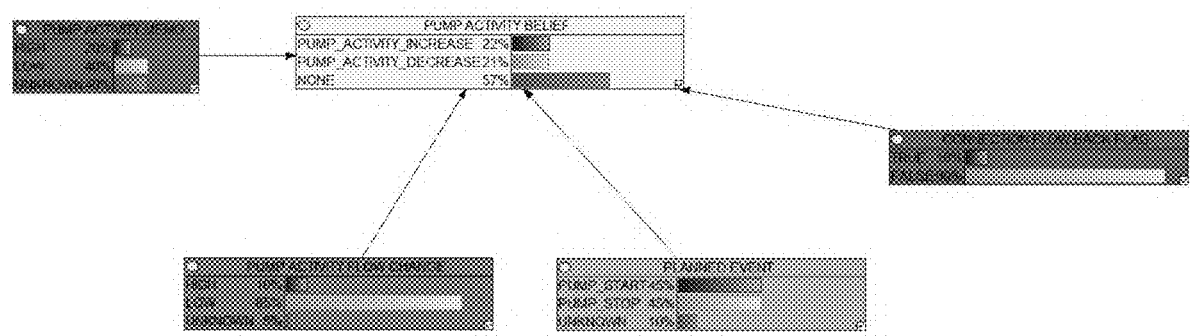
FIG. 20 illustrates Bayesian network nodes used in a model for detecting pump activity events.

Pump activity events may be identified by using a Bayesian network with four main features shown in FIG. 20. These include the connection flow back flag, pump start or stop (planned) event, pump activity flow change evidence, and the pump activity memo. Note that here, only pump activities are captured that occur when a connection is not happening. The connection flow back flag node is used to determine if the pump activity belief should be true or not. If the connection flow back flag is true, then the pump activity belief will remain low. The planned event node is used to determine if the pump activity is an increase or decrease. The pump activity flow change is a measurement of changes in the total pump output rate. This pump activity flow change node also takes account of the time it takes for the pit volumes to reach a steady state after the pump rates are changed. Finally, the pump activity memo uses drilling memo information to provide supplemental information on if the pump activity belief should be high.

More specifically, the "pump activity memo" node takes into consideration drilling memos that indicate pump activity. The memos are used to increase the pump activity belief. The node utilizes memo types that are related to pump activities, such as RECYCLE_PUMP. The "pump activity flow change" node measures changes in total pump output rate to determine if there has been a pump rate change. The pump activity flow change node accounts for the size of the pump activity change. The "planned event" node determines if the pump activity show be an increase event or a decrease event. When pumps are turned on, pit volumes are expected to decrease, and when pumps are turned off, pit volumes are expected to increase. This is due to compressibility of mud fluid and wellbore breathing. Finally, the "connection flow back flag" node is used to prevent the pump activity belief from rising during connections.

Figure 21:
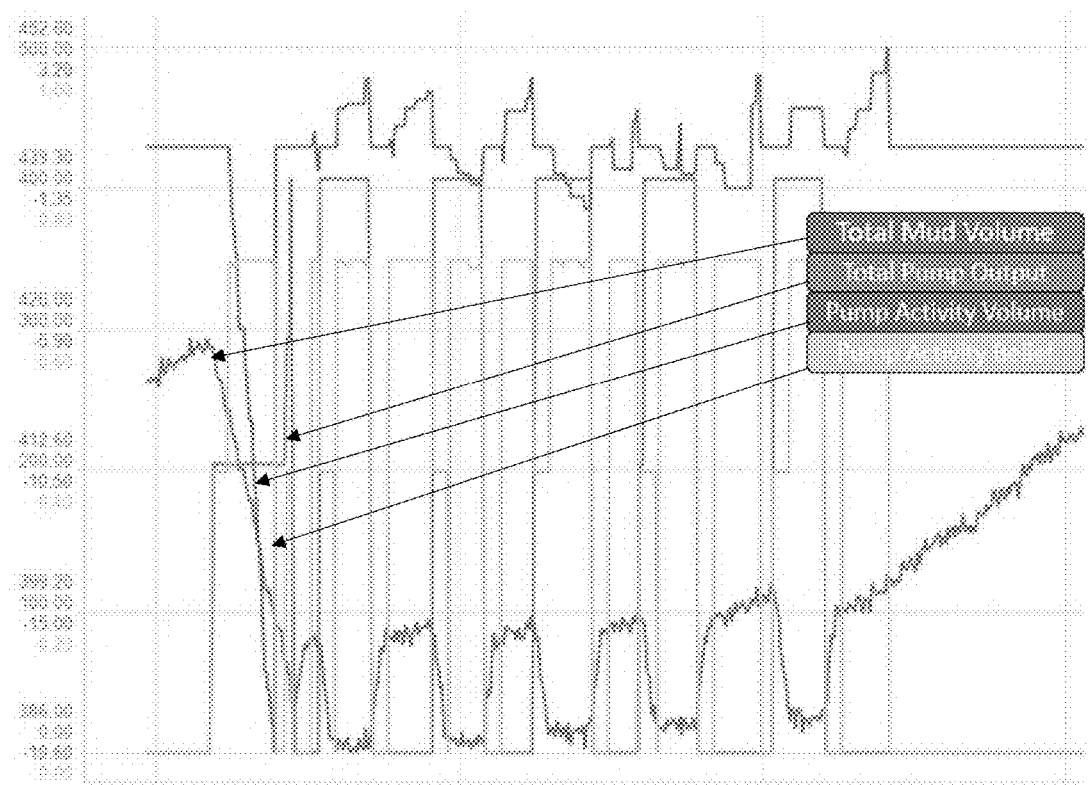
FIG. 21 is a graph illustrating examples of pump activities identified by a model.

FIG. 21 shows instances where the pump activity network identifies pump activity events. Here, the pumps are turned on and off rapidly, leading to increases and decreases in total mud volume measurements. The pump activity volume uses the detected events to measure the volume changes during these pump activity events as well.

Figure 22:
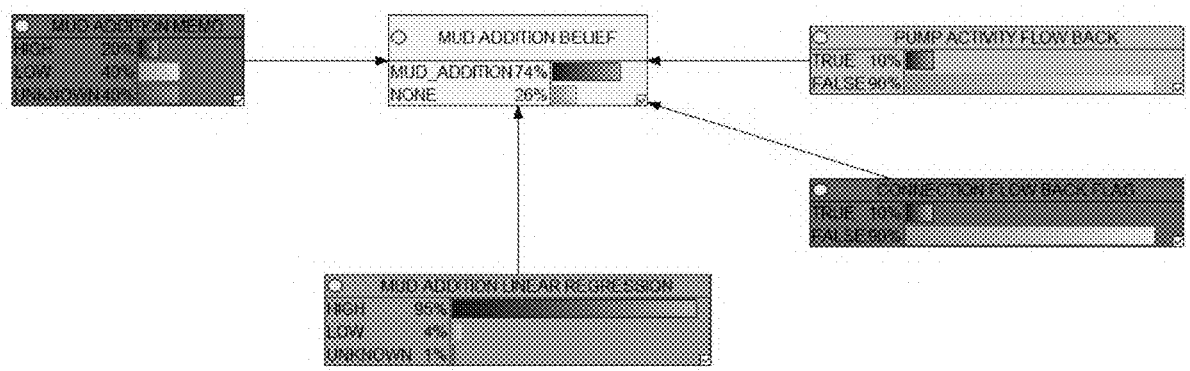
FIG. 22 illustrates Bayesian network nodes used in a model for detecting mud addition events.

Mud addition events may be identified by using a Bayesian network with four main features as shown in FIG. 22. These features include the connection flow back flag and pump activity flow back flag, which are both used to lower the mud addition belief if these nodes are true. The mud addition linear regression node is used to determine if there is a strong linear increase in the pit volumes which resembles mud addition. The mud addition linear regression node does not increase if the flow rate out is changing significantly, which could be an indication that the mud increase is a possible influx event. Finally, the mud addition memo is used to provide supplemental information on possible activities that add to the pit volumes, including activities such as SWEEPS and TRANSFERS.

More specifically, the "mud addition" network node for identifying mud addition events utilizes drilling memos (e.g., memo types categorized as SWEEP and TRANSFER) that indicate a mud addition, which increase the mud addition belief. The mud addition memo node helps to identify mud addition events as early as possible. The "mud addition linear regression" node is used to determine if there is a strong linear correlation in the total mud volume that would be expected to be seen when mud is consistently added to the pits. The mud additional linear regression node also accounts for changes in the flow rate out that may indicate a mud increase due to an influx event. The "pump activity flow back" node is used to prevent the mud addition belief from rising when there is pump activity. Because pump activity leads to either increases or decreases in pit volumes, pump activity may have similar signals to that of mud additions. Finally, the "connection flow back flag" is used to prevent the mud addition belief from rising when there is a connection flow back event. Like the pump activity flow back flag, a connection flow back may have signals that look like mud addition.

Figure 23:
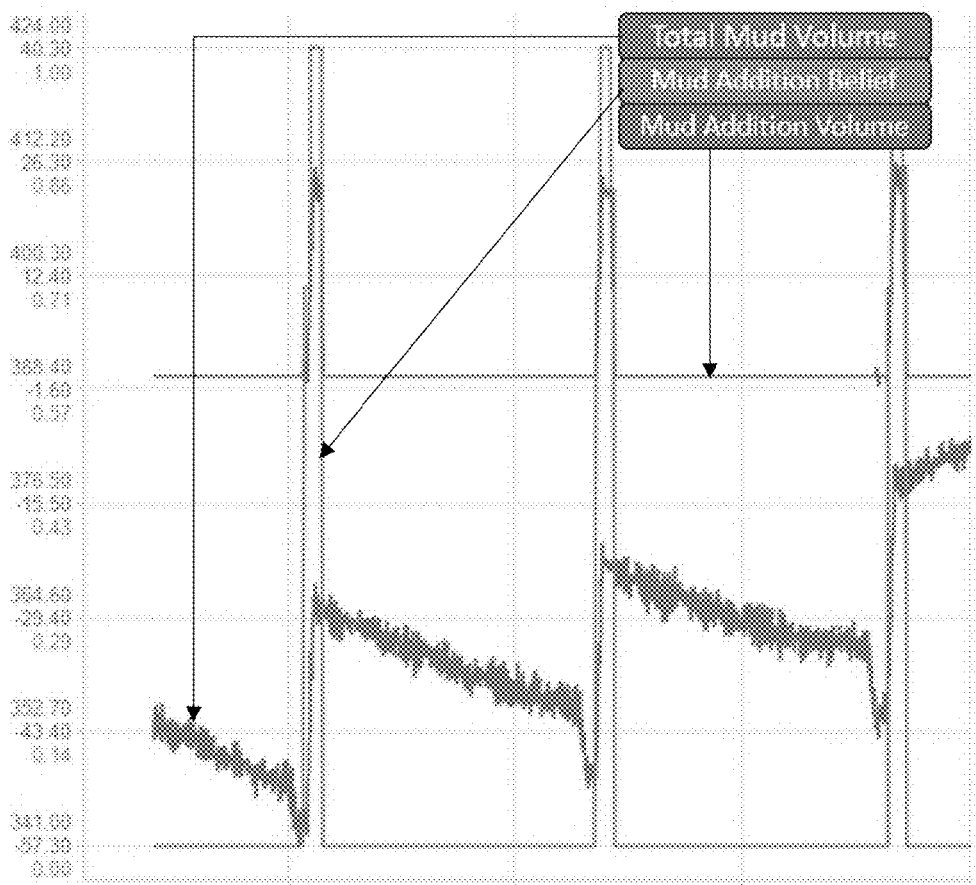
FIG. 23 is a graph illustrating examples of mud additions identified by a model.

FIG. 23 illustrates three instances where the mud addition network detects mud addition events. In the instance of mud addition belief, the drilling memo helps increase the initial portion of the mud addition belief where the belief initially rises to values around 0.7. The measured volume of the mud addition is around 25 barrels for each mud addition. The model is real-time, and these mud addition events are identified rapidly using the network features and drilling memos.

Figure 24:
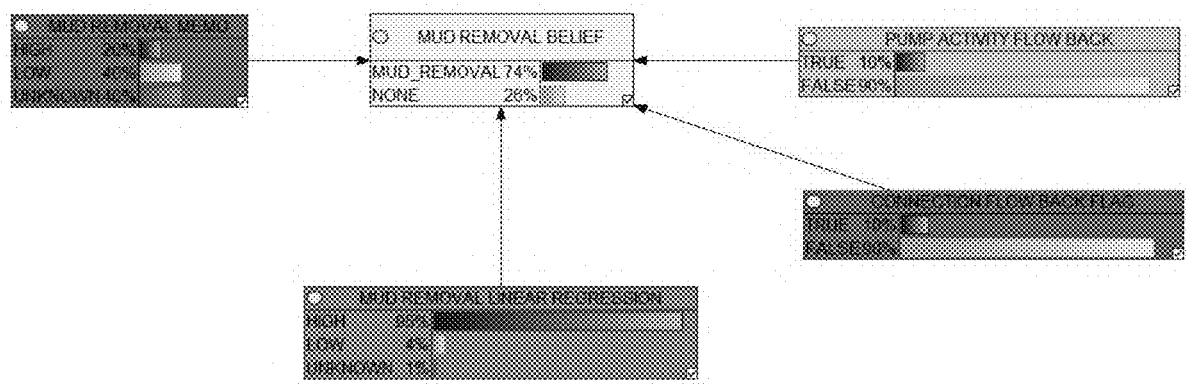
FIG. 24 illustrates Bayesian network nodes used in a model for detecting mud removal events.

Mud removal events may be identified by using a Bayesian network with the four mains features as shown in FIG. 24. These include the connection flow back flag and pump activity flow back flag, which are both used to lower the mud removal belief if these nodes are true. Regarding the pump activity flow back flag, because pump activity leads to either increases or decreases in the pit volumes, these may have similar signals to that of mud removals. Regarding the connection flow back flag, like that of the pump activity flow back flag, a connection flow back may have signals that look like a mud removal. The mud removal linear regression node is used to determine if there is a linear decrease in the pit volumes which resembles a mud removal. Finally, the mud removal memo node uses drilling memos to provide supplemental information on possible activities that remove from the pit volumes. Drilling memos may include those categorized as TRANSFER and DUMP activities, for example. The mud removal memo node helps to catch the mud removal event as early as possible.

Figure 25:
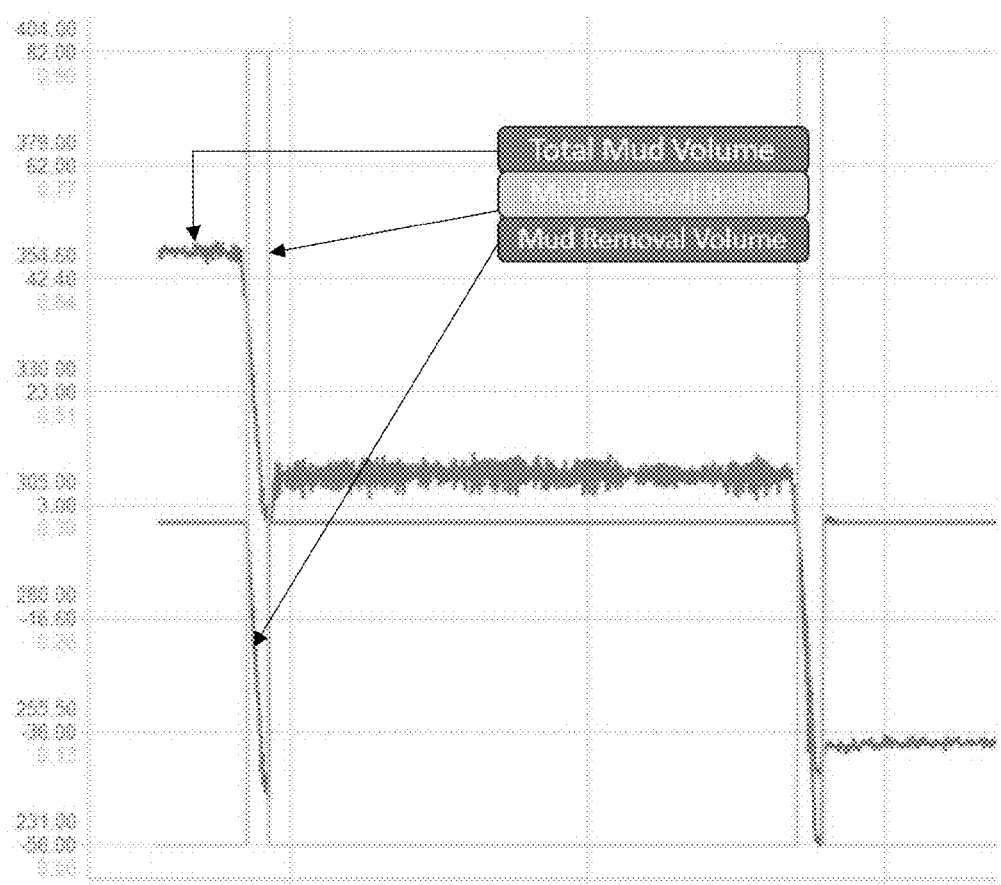
FIG. 25 is a graph illustrating examples of mud removals identified by a model.

FIG. 25 shows two instances where mud removal events are detected. Here, the model does take some additional time after the event has started to begin detecting the mud removal event, especially in the absence of supporting drilling memos. The measured volume change during these events reaches values around 50 barrels.

Figure 26:
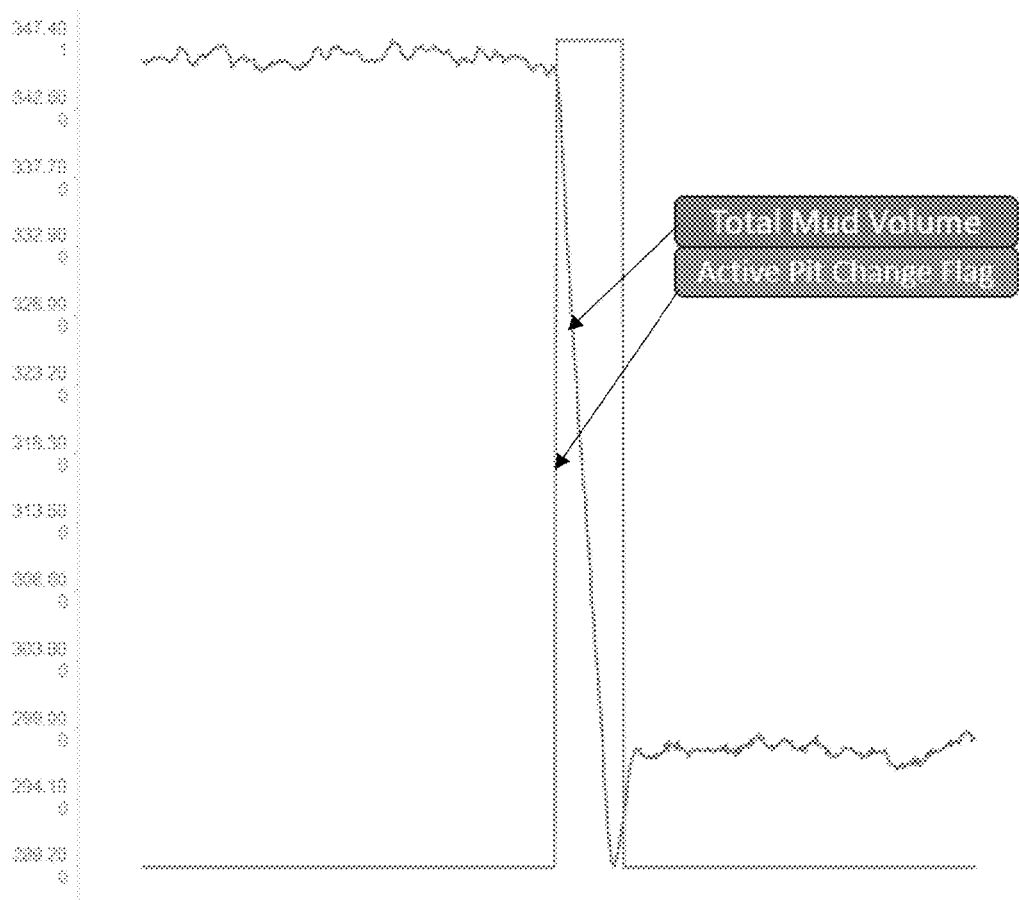
FIG. 26 is a graph illustrating an example of pit change identified by a model.

Pit change events are identified by observing rapid and instantaneous changes in the active total mud volume that indicate a pit is added or removed. These events are currently only considered when there are no other surface activities such as mud additions or connection flow backs. FIG. 26 shows an example of an active pit change event detected by the model.

Figure 27:
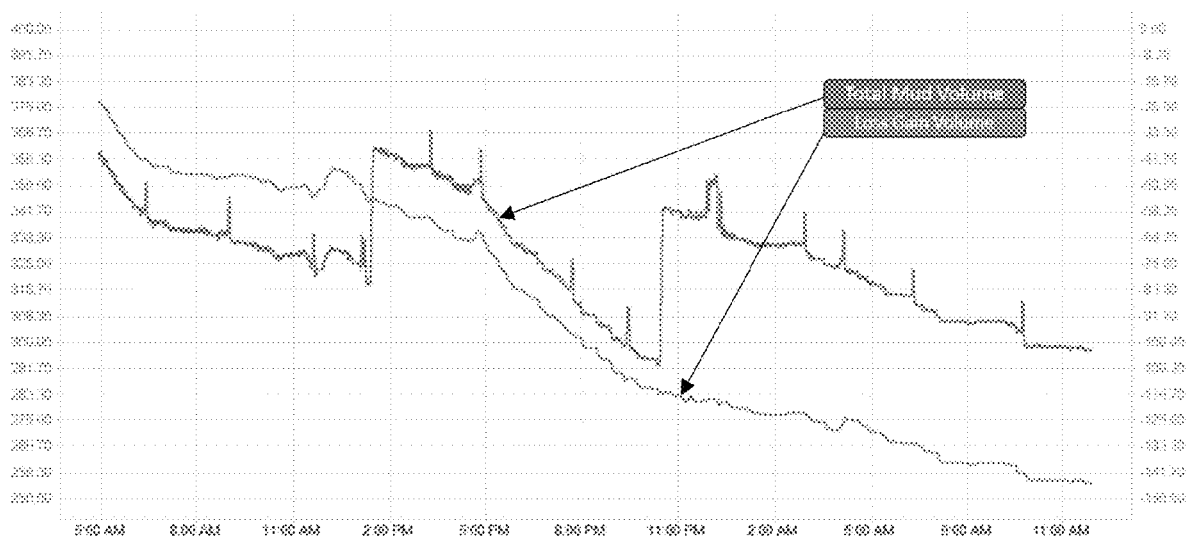
FIG. 27 is a graph illustrating a comparison between total mud volume and filtered loss gain volume.

By identifying surface activities that affect the total mud volume measurements, these activities can be filtered out of the total mud volume signals. As mentioned previously, the filtered signal is called loss gain volume, since it represents mud volume changes that are occurring due to downhole conditions independent of surface activities. With the new loss gain volume, the loss and gain rate can be measured by calculating the volume changes in the loss gain volume. Additionally, losses and gains can be estimated during surface activities by using historical volume changes right before the activity. These historical volume changes can also be accounted for when quantifying the surface activities such as connection flow back volumes and mud addition volumes. FIG. 27 illustrates an example of the raw total mud volume and the filtered loss gain volume. In this case, the connection flow backs and mud additions seen in the total mud volume are filtered out of the loss gain volume.

Figure 28:
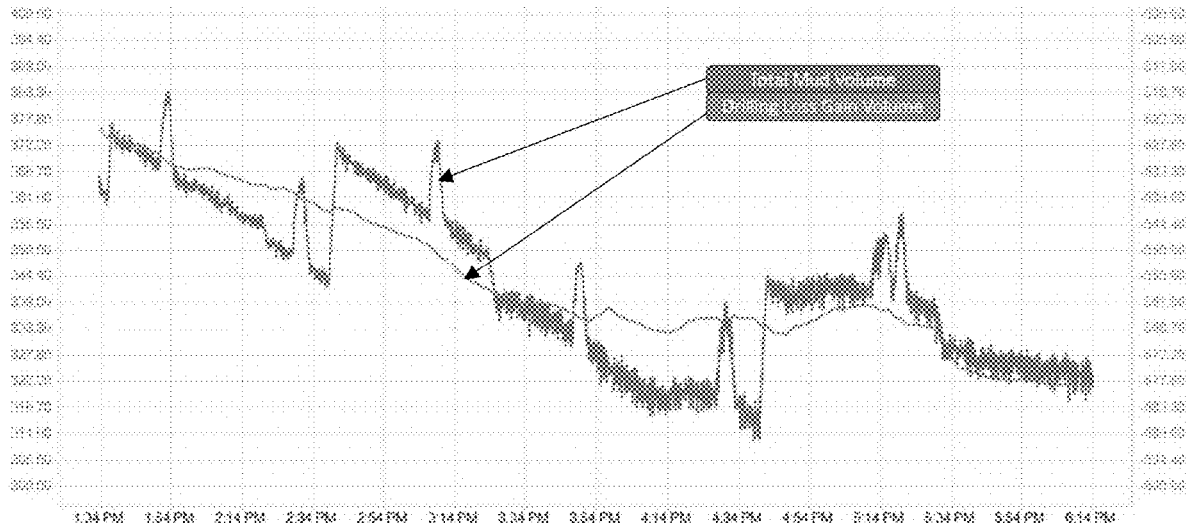
FIG. 28 is a graph illustrating a comparison between total mud volume and filtered drilling loss gain volume.

FIG. 28 illustrates an example of the drilling loss gain volume. The drilling loss gain volume is similar to the loss gain volume, except that it accounts for new volume created when drilling. This is calculated using the well geometry and properties of the BHA and drill string. This parameter accounts for decreases in the total pit volumes due to the new volume created downhole.

Figure 29:
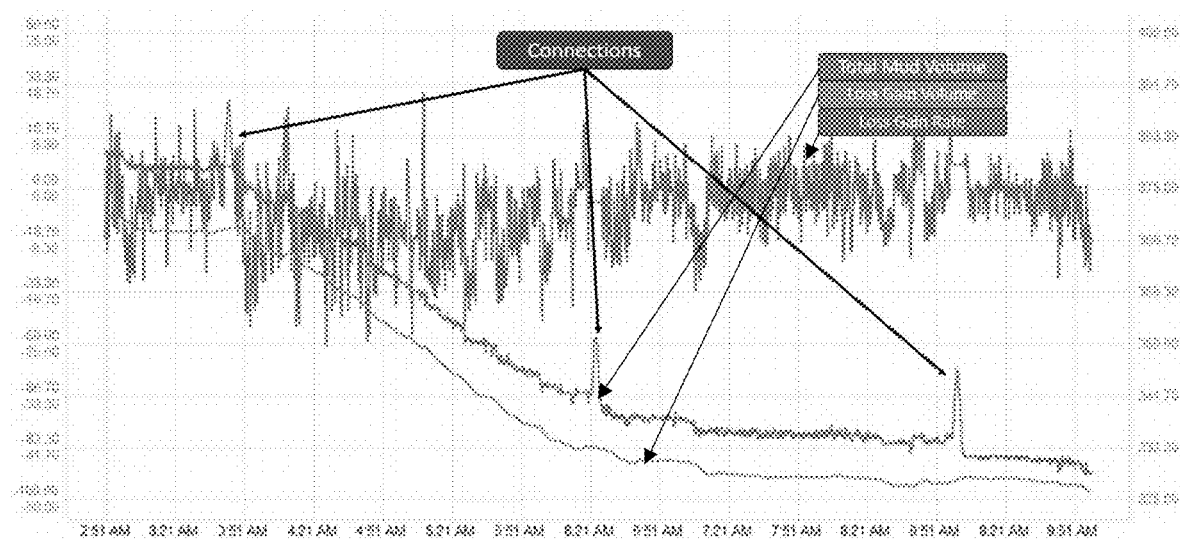
FIG. 29 is a graph illustrating calculated loss gain rate using loss gain volume.

FIG. 29 provides an example of the calculated loss gain rate using the loss gain volume. The total mud volume and loss gain volume begin decreasing between the first and second connections. The loss gain rate in this case is greater overall. However, between the second and third connections, the total mud volume and loss gain volume remains steady, which results in a loss gain rate that hovers, around 0.0 bbl/hr. Note that during events like the connections, losses are still estimated during the activity using historical loss gain rates.

Figure 30:
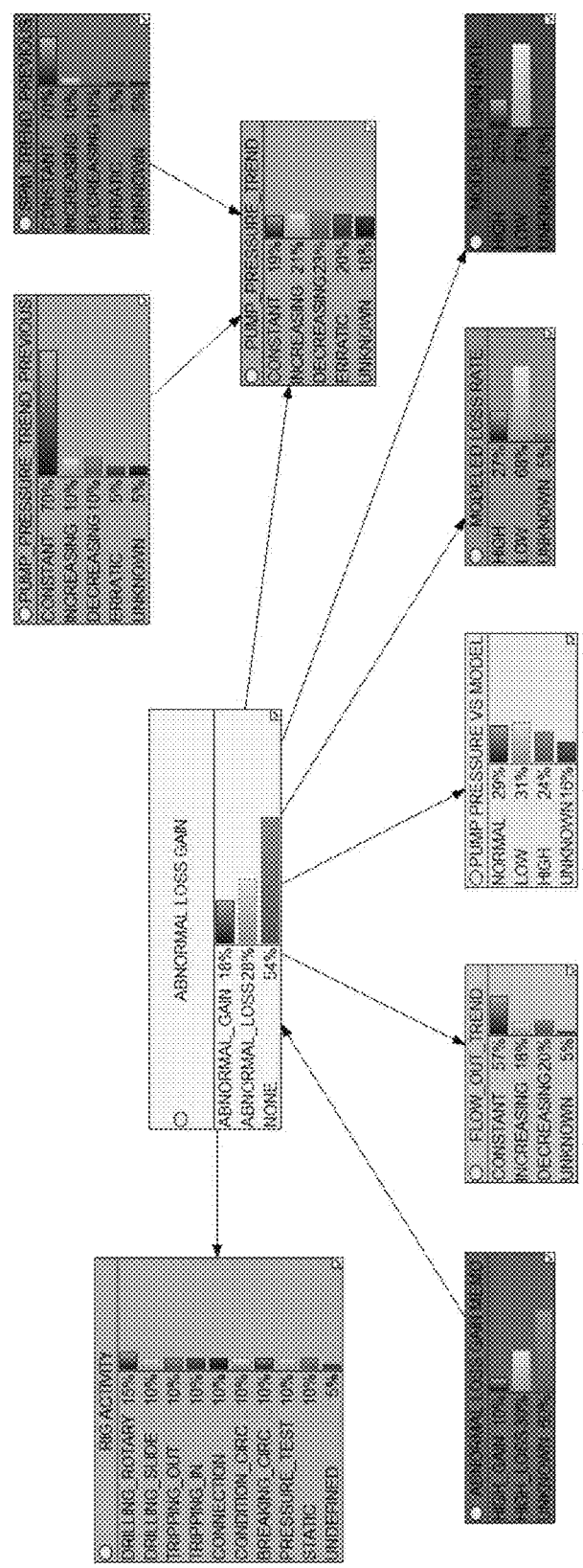
FIG. 30 illustrates Bayesian network nodes used in a model for detecting abnormal loss gain events.

With modeled loss gain volume, the loss and gain rates along with other parameters that can be used to identify possible lost circulation and kick events, a Bayesian network may be used identify these events. In the network, abnormal gain corresponds to a kick event and abnormal loss corresponds to a loss circulation event. FIG. 30 illustrates the network used to identify abnormal losses and gains. The network uses several nodes to determine an abnormal loss or abnormal gain event. The "rig activity" node indicates the current rig activity occurring in the well. For certain rig activities, e.g., connections or breaking circulation, the expectation or a gain or loss is higher. The "abnormal loss gain memo" node utilizes drilling memos to supplement either the abnormal gain belief or the abnormal loss belief. The memos can provide additional information regarding whether beliefs should be increased. If drilling memos are not provided, the node is UNKNOWN and does not affect the abnormal loss or gain belief. The "flow out trend" node is used to measure changes in the flow out sensor, which is used as an indicator for both losses and gains. For influx events, the flow out trend is expected to increase, since additional fluid is coming up to surface; for loss events, the flow out trend is expected to decrease, since fluid is being lost downhole. The "pump pressure vs. model" node functions to increase the abnormal gain belief if the pump pressure vs. model is high. A high pump pressure vs. model indicates that pressure is increasing, which is an indication of an influx event. This does not influence the abnormal loss belief. The "modeled loss rate" node takes into consideration the measured loss rate using the loss gain volume. If the loss gain volume has a high loss rate, then this value will be high, leading to a higher abnormal loss belief. Conversely, the "modeled gain rate" node is the measured gain rate using the loss gain volume. The modeled gain rate node also observes connection flow back volumes to see if there are high influxes during a connection when compared to historical connection flow backs. If the loss gain volume has a high gain rate, then the value will be high, leading to a higher abnormal gain belief. Finally, the "pump pressure trend" node considers the trend of the standpipe pressure. For abnormal losses, this trend is expected to be decreasing, as mud volume losses would lead to a pressure drop. For abnormal gains, this trend is expected to be increasing, as mud volume gains would marginally increase the pressure. In the abnormal loss gain model, the main parameters that affect the beliefs are the modeled loss rate and the modeled gain rate, which are derived from the calculated loss gain volume found by modeling the surface activities that affect pit volume measurements. The pump pressure trend and flow out trend also assist with abnormal losses and gains depending on the direction of the trends.

Figure 31:
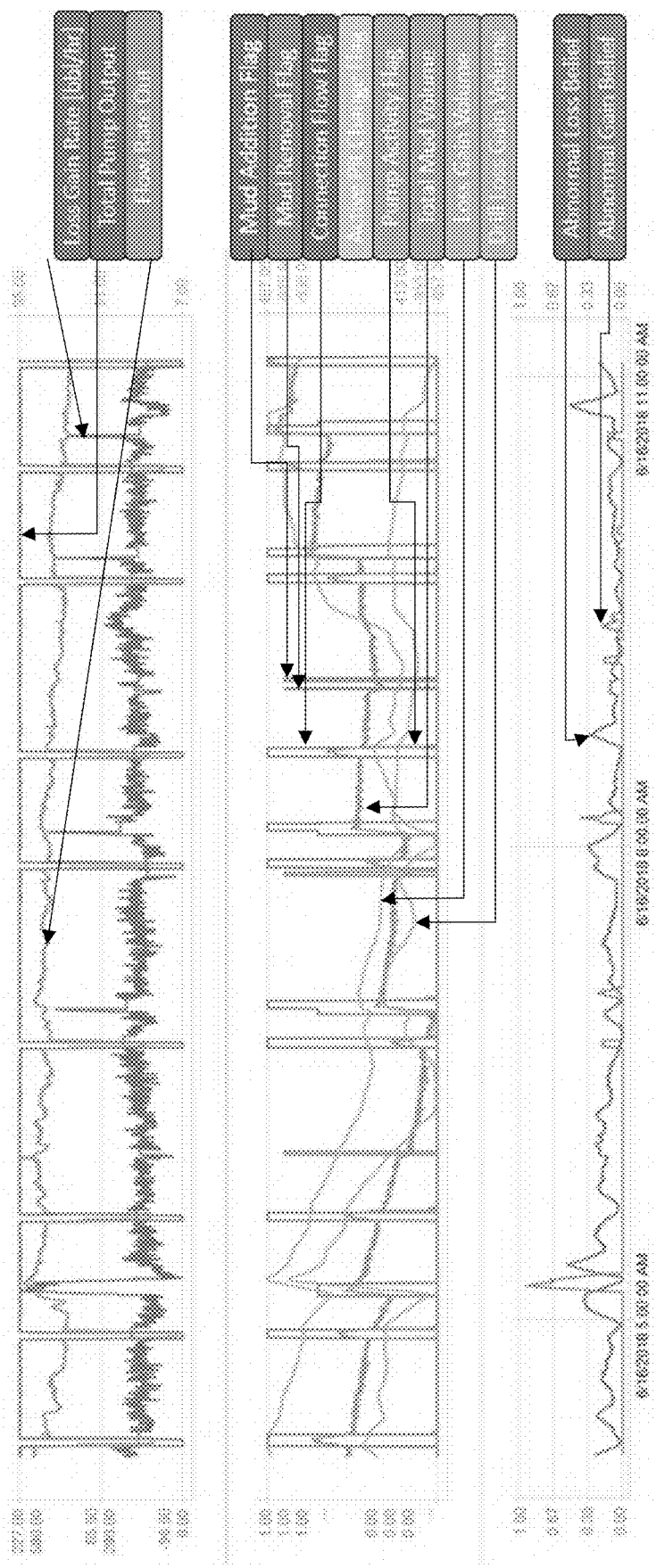
FIG. 31 is a graph illustrating a six-hour period of calculated loss gain parameters and surface activity flags, including abnormal loss and gain belief.

FIG. 31 is a graphical illustration of a six-hour period of drilling. These plots include the surface activity flags, the calculated loss gain rates and volumes, and the abnormal loss and gain beliefs. During this period of drilling, many mud additions, mud removals and connection flow backs are detected by the models. The use of drilling memos improves the accuracy and how quick the events are detected by the models. By identifying these events, the new filtered loss gain volume and loss gain rate can be used to identify loss and kick events. During this period of drilling, the overall loss and gain belief are low, as the changes in the loss gain volume are marginal.

Thus has been described various features and components of systems and methods for providing two-way communication between a user and software. The systems and methods utilize software that is embodied in a computer and that receives and provides information to a user regarding various events that may occur during a well drilling operation.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system.

The invention claimed is:

1. A method for providing two-way communications between a drilling advisory software and a user of the drilling advisory software, comprising:
   receiving a drilling data in real-time from one or more surface sensors operably connected to a drilling rig, the drilling data including measurements of wellbore fluid parameters and contextual data associated with a drilling operation of the drilling rig;
   receiving, in real-time, a drilling data memo comprising drilling data generated during the drilling operation (including a memo automatically generated by a rig sensor or entered by rig personnel), the drilling data memo being time-stamped within a predetermined threshold of current drilling data;
   classifying the drilling data memo into a memo type using a machine learning model, wherein the machine learning model is trained on historical drilling memos to categorize drilling data memos based on their content;
   extracting at least one drilling memo feature from the drilling data memo after classification, wherein the drilling memo feature indicates a surface activity affecting a wellbore fluid volume or pit volume measurement;
   updating a lost-circulation or kick detection model of the drilling advisory software using the drilling memo feature in combination with the real-time drilling sensor data, wherein said updating adjusts the model to account for the surface activity indicated by the drilling data memo so that sensor anomalies caused by said surface activity are distinguished from actual loss or kick events;
   detecting a drilling event associated with the drilling operation in real-time by applying the updated lost-circulation or kick detection model, wherein the drilling event comprises an abnormal fluid gain or loss condition indicative of a kick or lost circulation;
   generating an alert to the user upon detecting the drilling event, the alert providing details of the detected drilling event and prompting the user for feedback via a user interface of the drilling advisory software;
   updating the drilling advisory software based on user feedback received in response to the alert, wherein the user feedback is used to refine or confirm the detected event and dynamically adjust the detection model to improve accuracy; and providing a user memo to the user, wherein the user memo comprises information regarding how the drilling advisory software was updated.

2. The method of claim 1, wherein the drilling data memo comprises a user-generated memo.

3. The method of claim 2, further comprising communicating with the user at least one query, wherein the query is related to the drilling data memo.

4. The method of claim 1, further comprising generating a second alert after the drilling advisory software is updated, wherein the second alert includes additional details related to the drilling event indicated by the drilling data memo.

5. A system for providing two-way communications between a drilling advisory software for a well and a user of the drilling advisory software, the system comprising a computing device comprising a processor in data communication with computer memory, the computer memory comprising instructions that, when effected by the processor, perform the following steps:
 receive a drilling data in real-time from one or more surface sensors operably connected to a drilling rig, the drilling data including measurements of wellbore fluid parameters and contextual data associated with a drilling operation of the drilling rig;
 receive, in real-time, a drilling data memo comprising drilling data generated during the drilling operation (including a memo automatically generated by a rig sensor or entered by rig personnel), the drilling data memo being time-stamped within a predetermined threshold of current drilling data;
 classify the drilling data memo into a memo type using a machine learning model, wherein the machine learning model is trained on historical drilling memos to categorize drilling data memos based on their content;
 extract at least one drilling memo feature from the drilling data memo after classification, wherein the drilling memo feature indicates a surface activity affecting a wellbore fluid volume or pit volume measurement;
 update a lost-circulation or kick detection model of the drilling advisory software using the drilling memo feature in combination with the real-time drilling sensor data, wherein said updating adjusts the model to account for the surface activity indicated by the drilling data memo so that sensor anomalies caused by said surface activity are distinguished from actual loss or kick events;
 detect a drilling event associated with the drilling operation in real-time by applying the updated lost-circulation or kick detection model, wherein the drilling event comprises an abnormal fluid gain or loss condition indicative of a kick or lost circulation;
 generate an alert to the user upon detecting the drilling event, the alert providing details of the detected drilling event and prompting the user for feedback via a user interface of the drilling advisory software;
 update the drilling advisory software based on user feedback received in response to the alert, wherein the user feedback is used to refine or confirm the detected event and dynamically adjust the detection model to improve accuracy; and
 provide a user memo to the user, wherein the user memo comprises information regarding how the drilling advisory software was updated.

6. The system of claim 5, wherein the instructions, when effected by the processor, further perform the following step: communicate with the user at least one query, wherein the query is related to the drilling data memo.

7. A method for providing two-way communications between a drilling advisory software for a drilling operation and a user of the drilling advisory software, comprising:
 receiving a drilling data in real-time from one or more surface sensors operably connected to a drilling rig, the drilling data including measurements of wellbore fluid parameters and contextual data associated with a drilling operation of the drilling rig;
 receiving, in real-time, a drilling data memo comprising drilling data generated during the drilling operation (including a memo automatically generated by a rig sensor or entered by rig personnel), the drilling data memo being time-stamped within a predetermined threshold of current drilling data;
 classifying the drilling data memo into a memo type using a machine learning model, wherein the machine learning model is trained on historical drilling memos to categorize drilling data memos based on their content;
 extracting at least one drilling memo feature from the drilling data memo after classification, wherein the drilling memo feature indicates a surface activity affecting a wellbore fluid volume or pit volume measurement;
 updating a lost-circulation or kick detection model of the drilling advisory software using the drilling memo feature in combination with the real-time drilling sensor data, wherein said updating adjusts the model to account for the surface activity indicated by the drilling data memo so that sensor anomalies caused by said surface activity are distinguished from actual loss or kick events;
 detecting a drilling event associated with the drilling operation in real-time by applying the updated lost-circulation or kick detection model, wherein the drilling event comprises an abnormal fluid gain or loss condition indicative of a kick or lost circulation;
 generating an alert to the user upon detecting the drilling event, the alert providing details of the detected drilling event and prompting the user for feedback via a user interface of the drilling advisory software;
 updating the drilling advisory software based on user feedback received in response to the alert, wherein the user feedback is used to refine or confirm the detected event and dynamically adjust the detection model to improve accuracy; and
 providing a user memo to the user, wherein the user memo comprises information regarding how the drilling advisory software was updated.

8. The method of claim 7, wherein the drilling data memo data is a question from the user to the drilling advisory software.

9. The method of claim 8, further comprising:
 providing an answer to the question, the answer being based on data stored or accessible by the drilling advisory software and related to the drilling data memo.

\* \* \* \* \*